US 008670018B2

(12) United States Patent
Cunnington et al.

(10) Patent No.: US 8,670,018 B2
(45) Date of Patent: Mar. 11, 2014

(54) DETECTING REACTIONS AND PROVIDING FEEDBACK TO AN INTERACTION

(75) Inventors: Sharon K. Cunnington, Sammamish, WA (US); Rajesh K. Hegde, Redmond, WA (US); Kori Quinn, Redmond, WA (US); Jin Li, Sammamish, WA (US); Philip A. Chou, Bellevue, WA (US); Zhengyou Zhang, Bellevue, WA (US); Desney S. Tan, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 601 days.

(21) Appl. No.: 12/789,055

(22) Filed: May 27, 2010

(65) Prior Publication Data

US 2011/0295392 A1    Dec. 1, 2011

(51) Int. Cl.
*H04N 7/14* (2006.01)

(52) U.S. Cl.
USPC .......... 348/14.08; 348/14.09; 348/14.1; 370/260; 379/202.01; 709/202; 709/204; 715/701; 715/716; 715/730; 715/733

(58) Field of Classification Search
USPC ............ 348/14.01–14.16; 370/259–271; 370/351–357; 455/461–466, 550.1–560, 455/90.1–90.3, 456.1–466, 575.1–575.9, 455/3.01–426.2; 704/270–278; 709/201–207, 217–248
See application file for complete search history.

(56) References Cited

U.S. PATENT DOCUMENTS

| | | | |
|---|---|---|---|
| 5,598,209 A * | 1/1997 | Cortjens et al. .......... | 348/211.12 |
| 5,999,208 A * | 12/1999 | McNerney et al. ........ | 348/14.08 |
| 6,132,368 A | 10/2000 | Cooper | |
| 6,608,644 B1 * | 8/2003 | Kondo et al. .............. | 348/14.09 |
| 6,889,120 B2 | 5/2005 | Jouppi | |
| 6,990,639 B2 * | 1/2006 | Wilson ......................... | 715/863 |
| 7,187,764 B2 | 3/2007 | Ruetschi | |
| 7,346,654 B1 * | 3/2008 | Weiss ............................ | 709/204 |
| 7,454,460 B2 * | 11/2008 | Ivashin ......................... | 709/203 |
| 7,626,569 B2 * | 12/2009 | Lanier ........................ | 345/156 |
| 7,652,716 B2 * | 1/2010 | Qiu et al. ..................... | 348/370 |
| 7,765,045 B2 * | 7/2010 | Yoshida et al. ................ | 701/36 |
| 7,821,382 B2 * | 10/2010 | Kameyama ................ | 340/425.5 |
| 7,881,702 B2 * | 2/2011 | Heyworth et al. ......... | 455/414.1 |
| 7,965,859 B2 * | 6/2011 | Marks ......................... | 382/100 |
| 8,036,898 B2 * | 10/2011 | Sato et al. ..................... | 704/270 |
| 8,184,132 B2 * | 5/2012 | Sakamoto et al. ........... | 345/690 |
| 8,225,220 B2 * | 7/2012 | Barbaro Altieri ............ | 715/757 |
| 2002/0109719 A1 * | 8/2002 | Hata et al. .................... | 345/748 |
| 2003/0129956 A1 | 7/2003 | Virolainen | |

(Continued)

OTHER PUBLICATIONS

"New technology helps visually impaired to 'see' emotions", retrieved on May 7, 2010 at <<http://www.expertsvar.se/4.fe857aa117caa42683800010.html?prid=13478, Expert Answer Press Release, Published Apr. 27, 2010, 3 pages.

(Continued)

*Primary Examiner* — Hemant Patel

(74) *Attorney, Agent, or Firm* — Holly Nguyen; Carole Boelitz; Micky Minhas

(57) ABSTRACT

Reaction information of participants to an interaction may be sensed and analyzed to determine one or more reactions or dispositions of the participants. Feedback may be provided based on the determined reactions. The participants may be given an opportunity to opt in to having their reaction information collected, and may be provided complete control over how their reaction information is shared or used.

20 Claims, 16 Drawing Sheets

(56) References Cited

U.S. PATENT DOCUMENTS

| | | | |
|---|---|---|---|
| 2003/0163310 | A1 | 8/2003 | Caldwell et al. |
| 2004/0013252 | A1 | 1/2004 | Craner |
| 2005/0228676 | A1 | 10/2005 | Ifukube |
| 2005/0257174 | A1* | 11/2005 | Wilson .......................... 715/863 |
| 2005/0267826 | A1 | 12/2005 | Levy et al. |
| 2006/0074684 | A1* | 4/2006 | Yoshida et al. ............... 704/271 |
| 2007/0139515 | A1* | 6/2007 | Du Breuil .................. 348/14.01 |
| 2007/0285506 | A1* | 12/2007 | Schneider .................. 348/14.08 |
| 2008/0062252 | A1* | 3/2008 | Kawamura et al. ......... 348/14.09 |
| 2008/0198222 | A1* | 8/2008 | Gowda ............................ 348/62 |
| 2008/0266380 | A1* | 10/2008 | Gorzynski et al. .......... 348/14.08 |
| 2010/0186026 | A1* | 7/2010 | Lee et al. ......................... 725/14 |
| 2010/0226487 | A1* | 9/2010 | Harder et al. ............ 379/202.01 |
| 2010/0253689 | A1 | 10/2010 | Dinicola et al. |
| 2010/0257462 | A1 | 10/2010 | Barrett et al. |
| 2010/0321467 | A1* | 12/2010 | Goodman .................. 348/14.08 |
| 2011/0002451 | A1 | 1/2011 | Moran et al. |
| 2011/0096137 | A1 | 4/2011 | Baker et al. |
| 2011/0169603 | A1* | 7/2011 | Fithian et al. ................. 340/5.52 |
| 2011/0292162 | A1 | 12/2011 | Byun et al. |

OTHER PUBLICATIONS

Caldwell, Wardle, Kocak, Goodwin, "Telepresence Feedback and Input Systems for a Twin Armed Mobile Robot", retrieved on Mar. 30, 2010 at <<http://ieeexplore.ieee.org/stamp/stamp.jsp?arnumber=00540147>>, IEEE Robotics and Automation Magazine, Sep. 1996, pp. 29-38.

Jouppi, Iyer, Mack, Slayden, Thomas, "A First Generation Mutually-Immersive Mobile Telepresence Surrogate with Automatic Backtracking", retrieved on Mar. 30, 2010 at <<http://www.hpl.hp.com/personal/Norman_Jouppi/icra04.pdf>>, IEEE Conference on Robotics and Automation (ICRA), vol. 2, Apr. 26, 2004, pp. 1670-1675.

Rehman, Shafiq; "Expressing Emotions through Vibration for Perception and Control", Department of Applied Physics and Electronics, Umea University, Sweden, Apr. 2010, 173 pages.

Stone, "Haptic Feedback: A Potted History, From Telepresence to Virtual Reality", retrieved on Mar. 31, 2010 at <<http://www.dcs.gla.ac.uk/~stephen/workshops/haptic/papers/stone.pdf>>, Workshop on Haptic HumanComputer Interaction, 2000, pp. 1-7.

Ueberle, Esen, Peer, Unterhinninghofen, Buss, "Haptic Feedback Systems for Virtual Reality and Telepresence Applications", retrieved on Mar. 31, 2010 at <<http://www.lsr.ei.tum.de/fileadmin/publications/HD-Symp_2006_Ueberle.pdf, 2009, pp. 1-9.

Office action for U.S. Appl. No. 12/789,142, mailed on Dec. 25, 2012, Byun et al, "Non-Linguistic Signal Detection and Feedback", 13pages.

Office action for U.S. Appl. No. 12/789,142, mailed on Jun. 14, 2013, Byun et al., "Non-Linguistic Signal Detection and Feedback", 17 pages.

Office action for U.S. Appl. No. 12/789,142, mailed on Dec. 18, 2013, Byun, et al., "Non-Linguistic Signal Detection and Feedback", 23 pages.

* cited by examiner

| Candidate Titles 802 | Detected Reactions 804 | | |
| --- | --- | --- | --- |
| | Agreement | Disagreement | Confusion |
| Movie Title 1 | 20% | X | 65% |
| Movie Title 2 | 76% | | 5% |
| Movie Title 3 | 35% | X | 45% |

DETECTING REACTIONS AND PROVIDING FEEDBACK TO AN INTERACTION

BACKGROUND

When people interact and communicate in a face-to-face manner, each person naturally provides physical clues or signals that enable other people to determine the disposition, mood, reaction, emotion or other condition of the person with whom they are interacting. For example, a person can detect the disposition or emotions of another person through observation of physical gestures, eye movements, facial expressions, nervous tics, perspiration, changes in skin coloration, or other body language. People are able to both consciously and subconsciously interpret and use these signals as a gauge of the communication, and are able to adjust their interactions accordingly.

On the other hand, during a typical meeting involving a group of people, such as a conference, seminar, videoconference, etc., a speaker may not be aware of a condition of his or her audience. For example, the audience may be confused, bored, entertained, or the like, but a speaker or other participant may have little information or feedback on the actual condition of the majority of the audience. For instance, when a group of people are in a conference setting, the number of people in attendance may be too large for the others present to accurately read or interpret the current dispositions of the people at the conference. Furthermore, in a teleconference or other non-collocated situation, individuals may not share physical proximity, and may be using handheld devices, telepresence systems, or other communication devices which do not readily or easily expose the participants' reactions. The ability to ascertain the reactions or emotions of participants concurrently to the presentation of an idea is relatively straightforward or at least accessible when performed one-on-one and in person, but severe limitations occur when participants are not physically located face-to-face or if they are otherwise unable to directly observe the reactions of others. These impairments can impede natural conversation, and thereby decrease the effectiveness of communication.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide one or more participants of a group interaction with feedback regarding a reaction or disposition of one or more of the participants to the group interaction Implementations also enable adjustments to an environment based on the feedback, and further may provide for analysis and application of participant reaction information that is accumulated over time. Participants may be invited to opt in to have their reaction information collected and may be provided with complete control over how their information is shared or used.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 8 depicts an example of survey results according to some implementations.

DETAILED DESCRIPTION

Reaction Detection and Feedback

Figure 1:
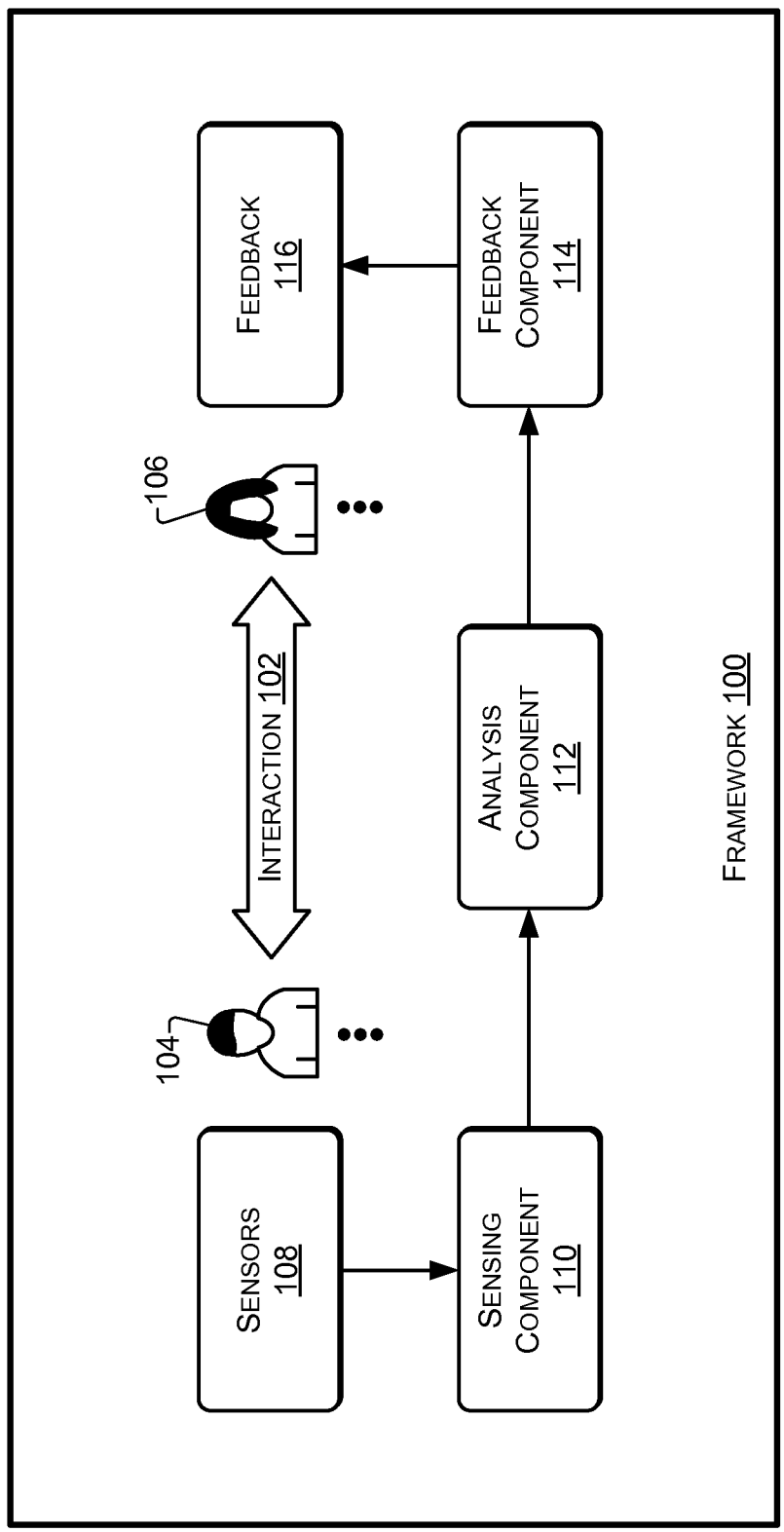
FIG. 1 depicts a block diagram of a reaction detection and feedback framework according to some implementations disclosed herein.

The technologies described herein are generally directed towards detecting reactions of one or more participants during interaction with others to provide feedback for improving communication. Some implementations provide input to participants of an interaction, such as a conversation or meeting, based on the reactions of the participants. For example, information gathered from the participants may be captured, analyzed, stored and made available for real-time influence during an ongoing interaction. Additionally, the gathered information may be applied to future interactions, such as for use in setting up a meeting environment or determining who should attend a meeting. Further, implementations may include automatically or manually manipulating an environment, such as a meeting or conference room, in response to detected reactions of participants present to attempt to influence the dispositions of the participants.

Some implementations herein may be used in a variety of different scenarios, such as large group meetings or seminars, smaller in-person group meetings, remote video conferences and meetings, ad hoc hallway interactions, and the like. For example, in a large group meeting or conference setting it can be difficult for participants to speak up, be heard, see others, or adjust to the needs of the entire group. By using sensing capabilities drawn from physiology, e.g., cardiopulmonary medicine, implementations can dynamically ascertain physical and physiological reactions of individuals. For instance, heart rate monitors and other devices may be used to determine an individual's heart rate, breathing rate, body temperature, or the like. Other types of sensors may be used to capture motion vectors, such as fluttering of the eyes, licking of the lips, posture, limb movements, twitches and other nervous or subconscious habits and body language which can then be analyzed and compared to baseline parameters, such as normal blink rate, etc. Other biometric signals that may provide information can include vibrations within the body or inner ear, skin conductance and perspiration levels, and pupil dilation, to name a few. For example, sensors located on the floor, in tables, and in chairs may measure vibrations, movement and activity levels of individuals, and map this information directly to comments spoken or visuals displayed during a presentation. Further, in some implementations, when consented to by the individual, such as for experimental purposes, sensors could even reside in the individual's body and be used to capture blood flow rate, take into account caffeine or glucose levels, hormonal levels, including releases of dopamine or epinephrine, and other bodily functions.

Privacy of individuals that chose to participate is protected by implementations herein. Accordingly, for those participants that consent to having their reactions detected, sensors can be activated to collect information for sensing a condition or reaction of the participants. For those individuals who do not consent, reaction information is not collected. Further, those individuals that consent are provided complete control over how much of their collected information they choose to share. For example, the collected information may be deleted by the individual, may be stored in a secure location accessible only by the individual, may be stored anonymously with the information of other individuals for use in interaction analytics, such as for detecting trends and patterns, or the like. Additionally, the individual may choose to share a portion of the information with one or more other participants, may choose to share a certain amount of information with some participants and not with other participants, and so forth.

According to some implementations, when certain detected reactions occur a signal or other feedback may be provided to the entire room or merely to one or more of the individual participants, such as a presenter, speaker, or moderator. For example, if the system detects confusion or disagreement of an audience, a particular sound could be generated, lighting in the room may be adjusted or changed in color, or other stimulus may be provided. For instance, if the system detects boredom or disengagement as a reaction from the participants, the system may adjust the lighting, start playing music, adjust the heating or cooling system, release particular scents to stimulate the olfactory receptors, produce a unique sound, or perform other actions to cause behavior modification.

Implementations also enable the storage and accumulation of data collected over time for carrying out meeting analytics, such as for detecting patterns and trends. The data collected can also establish a baseline of the meeting dynamics, so that it will be possible to differentiate culture/group dynamics (the meeting group are generally shy) vs. event particular dynamics (this meeting is boring). For example, sensor data and/or analysis data collected over a plurality of meetings can be stored by the system and used to establish one or more baselines or average reactions for particular meeting rooms, particular meeting room environment settings, particular participants, particular groups of participants, particular cultures, tasks topics, and the like. For example, a meeting comprised mainly of members of management may have a different baseline for reactions than a brainstorming meeting comprised mainly of engineers and researchers. Consequently, the system may establish a series of different baselines to be applied for increasing the accuracy in detecting reactions for a particular interaction, depending on the type of interaction, the purpose of the interaction, the participants attending the interaction, and so forth. By applying these pre-established baselines, the system may more accurately distinguish between a meeting-specific reaction (e.g., the meeting is boring) vs. cultural aspects of the participants, purpose of the meeting, location of the meeting, or the like.

The cumulative information collected from a plurality of interactions can be provided to individuals, presenters, and meeting organizers to improve meeting dynamics, effectiveness and productivity. In some implementations, the system or a meeting organizer can use the accumulated information to control the meeting room prior to a conference by setting up the room for a given experience. For example, when a new meeting that will take place is an extension of a previous meeting, and when it is known that particular adjustments were made during the previous meeting, such as increasing the lighting, reducing the temperature, changing the color of the lighting, etc., the room for the new meeting may be adjusted in a similar fashion to create a familiar setting and experience.

Additionally, the accumulated information can be provided to individuals to suggest modifications to their own behavior during an upcoming meeting or interaction. For example, if the system determines that an upcoming meeting will consist of mostly shy or non-talkative participants, the system can extract personalized information before the meeting, and inform a particular individual determined by the system to be the most gregarious or talkative person to refrain from dominating the meeting. On the other hand, if this particular individual is scheduled to attend a different meeting with participants that are mostly even more talkative, the system might recommend that the particular individual be more active during this meeting.

As another example, a seating arrangement of participants to an interaction can be suggested and/or controlled to achieve a desired effect or strategy based upon detected reactions and meeting dynamics gathered from one or more past interactions. For instance, people instinctively sit in certain locations when entering a room, such as due to hierarchy, negotiation norms, cultural conventions, habit, or merely in view of who is already in the room. According to some implementations, based on the system's learning of how people internally/externally respond to certain discussions or interactions, the system might recommend to a meeting coordinator that in order to create a certain meeting strategy, e.g. consensus, less adversarial approach etc., certain participants should sit in certain locations. Thus, if the system has detected that two individuals typically agree with each other, the system may suggest that these two people sit diagonally from each other for optimal communication. For example, the system can detect if two people generally move their heads in the same direction at the same time, or demonstrate other similar reactions at the same time, which may be detected by the system. Further, as another example, the system may suggest that two other individuals attending the meeting sit next to each other to encourage cooperation based on their past-analyzed emotional signals. Consequently, implementations herein can recommend seating or positioning arrangements for participants to an interaction, such as a meeting or negotiation, thereby improving the effectiveness of the interaction and increasing the likelihood of achieving a specific goal.

Furthermore, in the case of a videoconference or telepresence type of meeting or interaction, the arrangement of the participants on the screen may be controlled in response to past-determined reactions or emotional signals. For example, each a participant to the videoconference may be presented by the system with a different arrangement participant, so that each individual is presented with an arrangement of participants that is most beneficial or useful. For instance, when an individual reacts to certain participants more frequently, more strongly, or the like, those participants might be presented more prominently, have an enlarged display, or the like.

In addition, as feedback to a speaker, presenter, or moderator, the system may provide a suggestion to modify presentation content when the system has detected that meeting participants get confused at a particular slide or demonstration. Additionally, as feedback to an individual, the system may suggest through scheduling tools such as Microsoft® Outlook® whether or not a particular individual should attend a particular meeting. For example, the system may identify certain people or topics that cause a particular reaction in the particular individual and provide the particular individual further information on that emotion/reaction detection. For example, the information may be provided to a particular individual to assist the individual in preparing for the meeting, or in determining whether to attend a meeting. This information can be automatically provided to other programs, such as calendar programs, meeting scheduling programs, and the like, to automatically assist individuals in scheduling their meetings.

FIG. 1 illustrates an example of a reaction detection and feedback framework 100 for explanation purposes. In the illustrated example, framework 100 is able to detect reactions and provide feedback to an interaction 102 between a plurality of individuals, including a first participant 104 and a second participant 106. Sensors 108 may be provided in the proximity of one or more of the participants 104, 106 for sensing physical and biometric reactions of the participants 104, 106. Sensors 108 may be a plurality of different sensors for sensing physical conditions of the participants, as discussed above, such as video cameras, microphones, motion detectors, vibration detectors, devices for reading physiological and biological metrics, and the like. Information on sensed physical conditions of the participants obtained by the sensors 108 is provided to a sensing component 110 that receives and stores the raw data from the sensors 108. As one example, the sensing component continually receives and records input from the sensors 108 during the interaction 102. Additionally, at a specified point in time, a pulse may be sent out, for example, to heat sensors in the room to determine changes to the body temperatures of participants, or to other sensors to determine other physiological changes, in light of given comments or displays.

The sensing component 110 provides the received and stored sensor information to an analysis component 112. The analysis component 112 performs analysis on the received sensor information for determining a disposition or reaction of one or more of the participants 104, 106. For example, the analysis component 112 may aggregate and correlate the information from the sensors 108 for determining that a particular participant is experiencing a particular emotion or reaction. The analysis component may provide this information to a feedback component 114 which can determine appropriate feedback 116. In some implementations, feedback 116 may include real-time messages or other signals delivered to one or more participants 104, 106. For example, a message or sound may be delivered to a presenter, or to all the participants in a meeting. For instance, certain chimes, alerts or other sounds can be produced to signify certain detected audience reactions, such as confusion, boredom, etc.

Feedback 116 may also include automatic or manual adjustment of one or more environmental parameters in a meeting room, such as lighting, temperature, sound etc. Additionally, feedback 116 may include analysis information provided to one or more of the participants 104, 106, or to others, such as meeting coordinators, at a later point in time. For example, feedback 116 may be provided to a presenter at a later point in time for training or coaching purposes, adjusting the content of a presentation, or the like. Further, feedback 116 may be provided to determine room setting conditions for future meetings, for determining recommended seating arrangements, or for determining which individuals should attend future meetings.

Accordingly, the analysis data provided by the analysis component 112 can be stored and made available for immediate or future consumption by the feedback component 114. In the case of immediate consumption participants may be provided with their own data and this data may be used for training or coaching purposes, to increase self-awareness, or for more tangible visible results such as improving presentation style. The analysis data may also be used by an individual to help the individual change the way in which the individual is perceived by other participants. As another example, a user may approach a colleague with captured reaction signals and probe the colleague as to what these signals mean and whether the framework correctly identified the emotions and reactions intended.

In another aspect, the framework may translate a series of inputs from multiple meeting participants into an aggregated synopsis of how people are reacting to an idea during a presentation. For example, feedback component 114 may provide a real-time visualization or display of the data gathered by the sensors to provide an indication as to how the idea has been received by the audience. As described additionally below, a user interface may be provided that summarizes the audience's reaction to an idea, a discussion or the like. In some implementations, the summarized data may be provided through an anonymous reading of participants' reactions by detecting unspoken biological and physical reactions that convey the audience's attitude or disposition in response to an idea or topic. Thus, the system is able to learn patterns relating to a particular topic or subject of an interaction, learn patterns for particular presenters or speakers, and learn patterns for particular audiences. Further, while the framework is described herein in a meeting context, the framework may also be employed in a variety of other applications including focus groups, interrogations, student/teacher educational settings and negotiation sessions.

To protect privacy of individuals, the individuals are invited to consent to having their reactions detected before any detection takes place. Reactions of individuals who have not consented are not detected. Further, individuals are provided with the ability to control how much of their information is revealed to others. For example, a user may select an option before, during, and/or after a meeting to indicate the level of information that the user would like to disclose in the given setting. Accordingly, the individual may create both shared and private data streams, in which a portion of the individual's data can be shared and made available to others, while another portion of the data may be retained in private and accessible only to the individual. Furthermore, as a first participant 104 releases more of his or her information, the framework 100 may suggest to a second participant 106 to share more information, thereby creating a reciprocal arrangement. When these individuals encounter each other again, the framework 100 may recognize the past sharing arrangement and begin at that level of biometric and emotional sharing.

Figure 2:
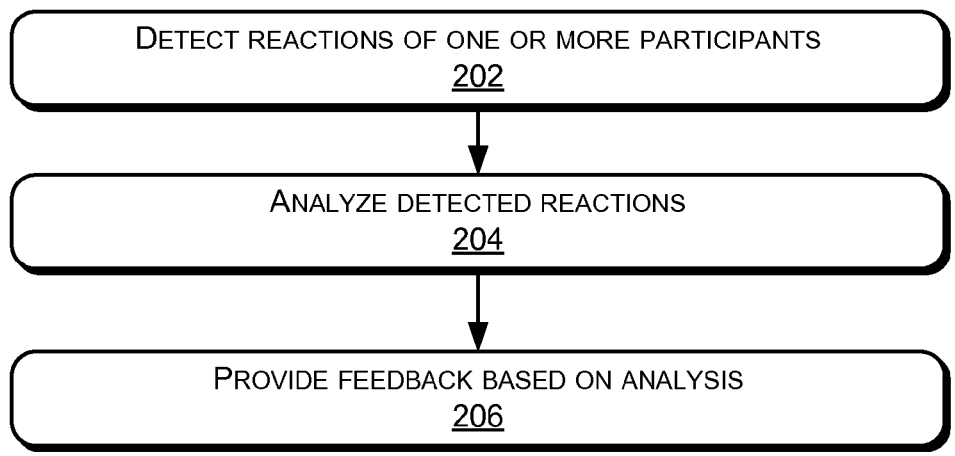
FIG. 2 depicts a flow diagram of an example process for reaction detection and feedback according to some implementations.

FIG. 2 illustrates an example of a process 200 for detecting reactions and providing feedback according to some implementations herein. In the flow diagram, the operations are summarized in individual blocks. The operations may be performed in hardware, or as processor-executable instructions (software or firmware) that may be executed by one or more processors. Further, the process 200 may, but need not necessarily, be implemented using the framework of FIG. 1. Consequently, by way of explanation, and not limitation, the process 200 is described in the context of the framework of FIG. 1.

At block 202, the reactions of one or more participants to an interaction are detected. For example, as described above, following receipt of participant consent, sensors 108 may be used to detect the reactions of one or more participants during a meeting, seminar, conference, presentation, or other interaction. The sensors may detect any of a variety of physical conditions or reactions, such as facial expressions, facial movements, body movements, body language, posture, eye focus location, pupil dilation, heart rate, body temperature, breathing rate, skin coloration, speech qualities, or other body signals or clues to the disposition of the individual.

At block 204, the information gathered by the sensors on the detected physical conditions or reactions of the participants is analyzed. For example, the physical reactions detected by a plurality of sensors are correlated to a participant, combined and analyzed to determine a most likely reaction, mood or disposition of one or more of the participants. Thus, the sensed physical condition data for each participant can be isolated from the sensed physical condition data of the other participants to determine a reaction being experienced by each participant based on the correlated sensor data for that participant. For example, statistical analysis may be used to determine a likelihood, based on the data collected by the sensors, that a participant is experiencing a particular reaction.

At block 206, feedback is provided based on the analysis of the reaction data. For example, feedback may be provided in real time to one or more of the participants. The feedback provided may be anonymous to protect the privacy of the individual participants. In some implementations, the inferred reactions for a plurality of participants are aggregated to provide aggregated feedback indicative of an overall reaction of the participants to an interaction. For example, the aggregated feedback can indicate an audience's reaction to a particular topic, idea, presenter, or the like. The aggregated feedback can be used in real time to modify a discussion, presentation, meeting, etc., to improve communication, regain audience interest, respond to audience concerns, and so forth. The aggregated feedback can also be used subsequent to the interaction, such as for training purposes, improving a presentation or presentation style, improving a meeting environments, etc. Further, in some cases, the feedback for each individual is provided only to that individual, and the individual is provided with an option as to whether or not to share the information. Alternatively, or in addition, the environment may be automatically or manually adjusted based on the results of the analysis. Additionally, the analysis results may be stored and provided at a later time as individual or collated feedback to one or more of the participants, and further may be used over the long-term for detecting trends and patterns of behavior, and so forth.

The above framework and process for detecting reactions and providing feedback may be implemented in a number of different environments and situations. The framework receives an input from a variety of sensors that sense physical body-based phenomena and conditions. The framework performs computation and analysis on the sensed conditions to infer an abstract state of a participant, such as behavior, emotion, cognitive state, disposition, or other reaction. The inferred reaction can be used to provide feedback as an output of the framework, e.g., feedback to the participant himself or herself, feedback to others, direct control of an environment of the participant, and the like. Further, the framework can be applied in a large variety of different interaction scenarios, such as co-present meetings, presentations and seminars, remote video conferences, ad hoc hallway interactions, and the like. While several examples are described below for explanation purposes, the disclosure herein is not limited to the specific examples, and can be extended to additional environments, applications and settings.

Example Conference Setting

Figure 3:
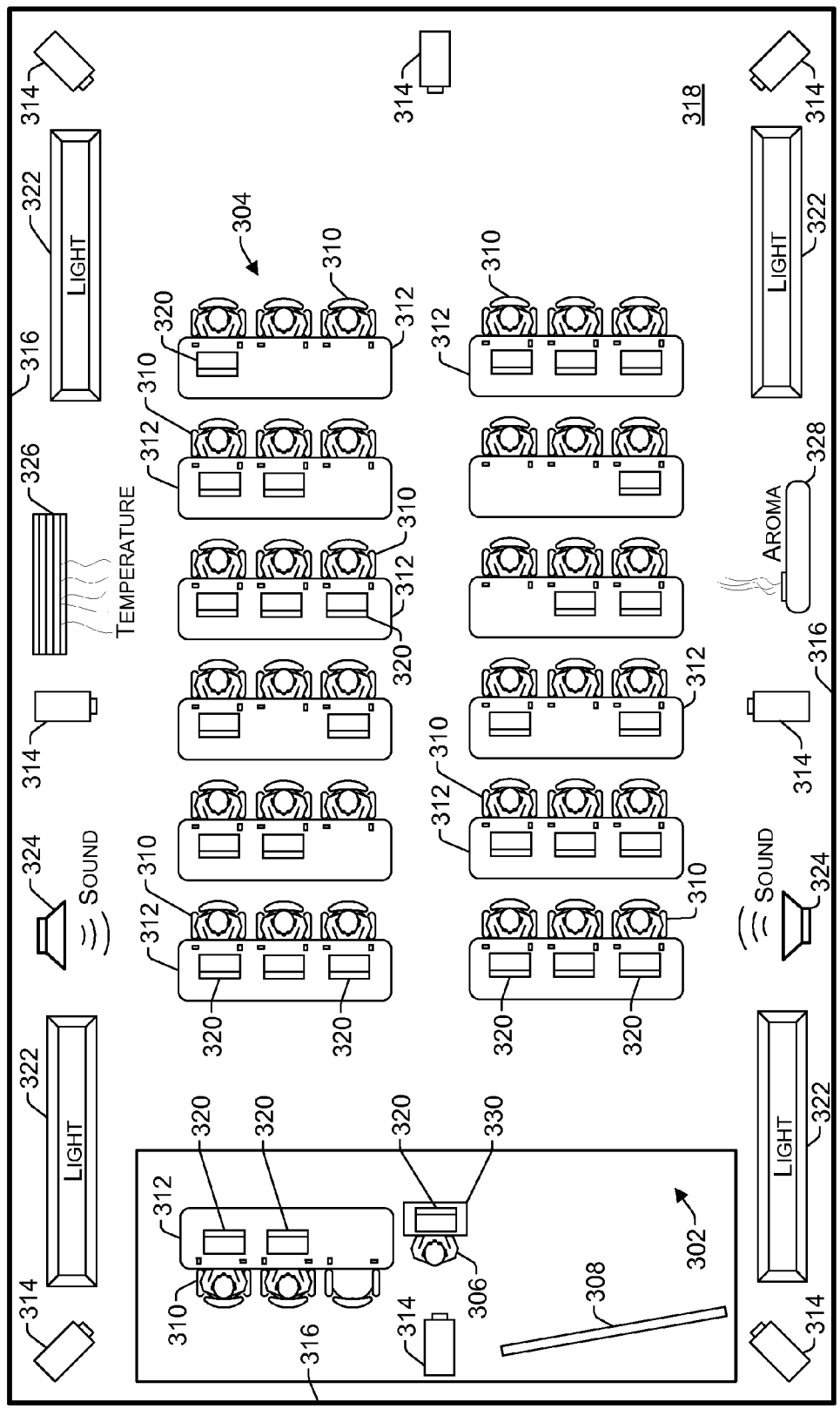
FIG. 3 depicts an example of a conference room system according to some implementations.

FIG. 3 illustrates an example of a setting in a seminar or conference room as part of a system 300 according to some implementations herein. A plurality of participants 302 in attendance in the conference room may include an audience 304 and a presenter 306. The presenter 306 may deliver a presentation to the audience 304, such as by discussing slides or video displayed on a display 308. The audience 304 may be seated in chairs 310 at tables 312 for viewing and listening to the presentation. The system 300 may be outfitted with a variety of different sensors for detecting the reactions of the participants 302. For example, the sensors may include a plurality of video cameras 314, and numerous other sensors that may be attached to the chairs 310, tables 312, walls 316, floor 318, ceiling (not shown in FIG. 3), user computing devices 320 of the participants, or other suitable locations. For example, as will be described additionally below with respect to FIG. 4, the sensors included in the system 300 may include microphones, body temperature sensors, pulse or heart rate detectors, vibration detectors, body movement sensors and numerous other devices for detecting physical, physiological and biological conditions and aspects of the participants 302. Further, the participants may optionally have user computing devices 320 that communicate with and participate in the system 300, as discussed additionally below.

In some embodiments, the system may first invite the participants to opt in to having their reactions detected. For those participants that consent, reaction sensors will be activated and physical conditions sensed. For those participants who do not consent, physical conditions will not be sensed and reactions will not be detected. For example, user computing devices 320 may be used to request consent, or if not all participants have user computing devices 320, assigned seating may be used to determine which participants have consented. Further, according to some implementations, chairs 310 may include controls for enabling a participant to indicate consent. For example, a participant may opt in to having their reactions detected by activating a power button and a suitable consent protocol on the chair 310. If the chair power is off, or if the consent protocol has not been followed, then the participant's reactions are not detected.

For the consenting participants, the system may constantly monitor the acoustic levels and pitch of voices, as well as detected metronome type sounds (e.g., tapping, etc., possibly indicating frustration) and provide various interpretations by comparison with baseline acoustic patterns. As another example, three-dimensional face mapping, facial expression reading, facial movement tracking, head movement tracking, hand movement tracking, or the like can be employed to identify the regular expressions and movements that people use when communicating, and thereby detect the emotions or dispositions normally associated with these movements or expressions. Similarly, video tracking can be used to detect breathing rate, changes in skin coloration, or the like, while infrared sensors can be used to detect body temperature changes.

In addition, the consent to have reactions detected can change throughout the interaction. For example, a participant may consent to have reactions detected for an entire meeting except during the discussion of one or more particular topics. In another scenario, a participant may initially begin the meeting by not consenting, but when a different topic is raised the participant may modify his or her privacy setting to provide reaction feedback to all other participants, just one or more selected participants, just to an anonymous aggregate, and so forth. As described additionally below, a control interface can be provided to the participants to enable each participant to specifically control the access to and dissemination of any collected reaction information and inferred reactions, emotions, cognitive states, and the like. The participants can use the interface to control collection, storage and dissemination of their reaction information before, during and after an interaction.

The system 300 may further include a plurality of environmental components that can be controlled manually or automatically for adjusting the environment of the conference room. Examples of the environmental components may include lighting 322, speakers 324 or other sound generators, ventilation devices 326 or other means for controlling the temperature and air flow in the room, an aroma generator 328 able to generate various aromas, and other suitable environmental components.

The presenter 306 may deliver a presentation to the audience 304 while the sensors in the room detect the reactions of the consenting participants of the audience 304. For example, the sensors may detect the audience reactions in an ongoing manner and this information may be passed to a computing device (not shown in FIG. 3) for analysis and generating feedback. Any suitable communication technique may be used, such as a wired or wireless network, direct connection, or the like, as will be described additionally below with reference to FIG. 10.

Feedback may be provided directly to the presenter during the presentation, or subsequent to the presentation to improve communication with the audience. Thus, in some implementations, the presenter may be provided with any of visual, aural or tactile feedback during the presentation to indicate how the presentation is going. For example, the presenter may wear a wireless earpiece or receiver for receiving aural feedback regarding a reaction of the audience. The feedback may include a verbal description of the audience reaction or other sound provided through the earpiece at audio levels of normal speech, or at lower audio levels, such as equivalent to a whisper. As another example, rather than receiving audio feedback through an earpiece, the presenter may receive audio feedback from focused directional or local speakers, such as speakers built in to a podium 330 at which the presenter is standing during the presentation.

Additionally, a presenter may receive tactile feedback in a number of different manners, including any of vibrations, nudges, electrical impulses, pin pricks, heat spots, and the like. For example, the podium 330 or a floor on which the presenter is standing may include one or more pads for generating vibrations or other tactile feedback understood to signify a certain audience reaction. For instance, vibrations, heat or other tactile stimuli delivered to a certain part of a presenter's body may indicate one reaction, while tactile stimuli delivered to another part of the presenter's body may indicate another reaction.

In addition, the presenter may be provided with visual feedback, such as on a display device, through activation of one or more lights, or other visual indications provided, e.g., at the podium 330 or elsewhere. Further, as will be described additionally below with reference to FIG. 5, the presenter 306 and/or other participants 302 may be provided with user interfaces on the computing devices 320 that enable display and control of certain functions described herein. During the presentation, the system 300 can detect various reactions of the audience 304 and provide visual or audio feedback to the presenter 306 regarding the condition of the audience, such as whether the audience is interested, confused, bored, or the like.

As another example of feedback, not only to the presenter, but also to the other participants, the environmental conditions in the conference room may be controlled by the system 300 for affecting the reactions or disposition of the audience 304. For example, the lighting may be adjusted, certain music or other sounds may be provided, the temperature in the room may be adjusted, or various aromas may be released to stimulate or otherwise influence the audience 304. Additionally, as described above, the information may be stored and provided as feedback at a later point in time such as for enabling the presenter to adjust his or her presentation style, alter the format of the meeting (e.g., break into subgroups instead of using a one-to-many presentation style), or change topic analysis, clarify certain areas of the presentation, or the like. Also, the information collected may be used for meeting analytics, such as for identifying long-term trends or patterns in the behavior of people in certain meeting situations or environments.

Figure 4:
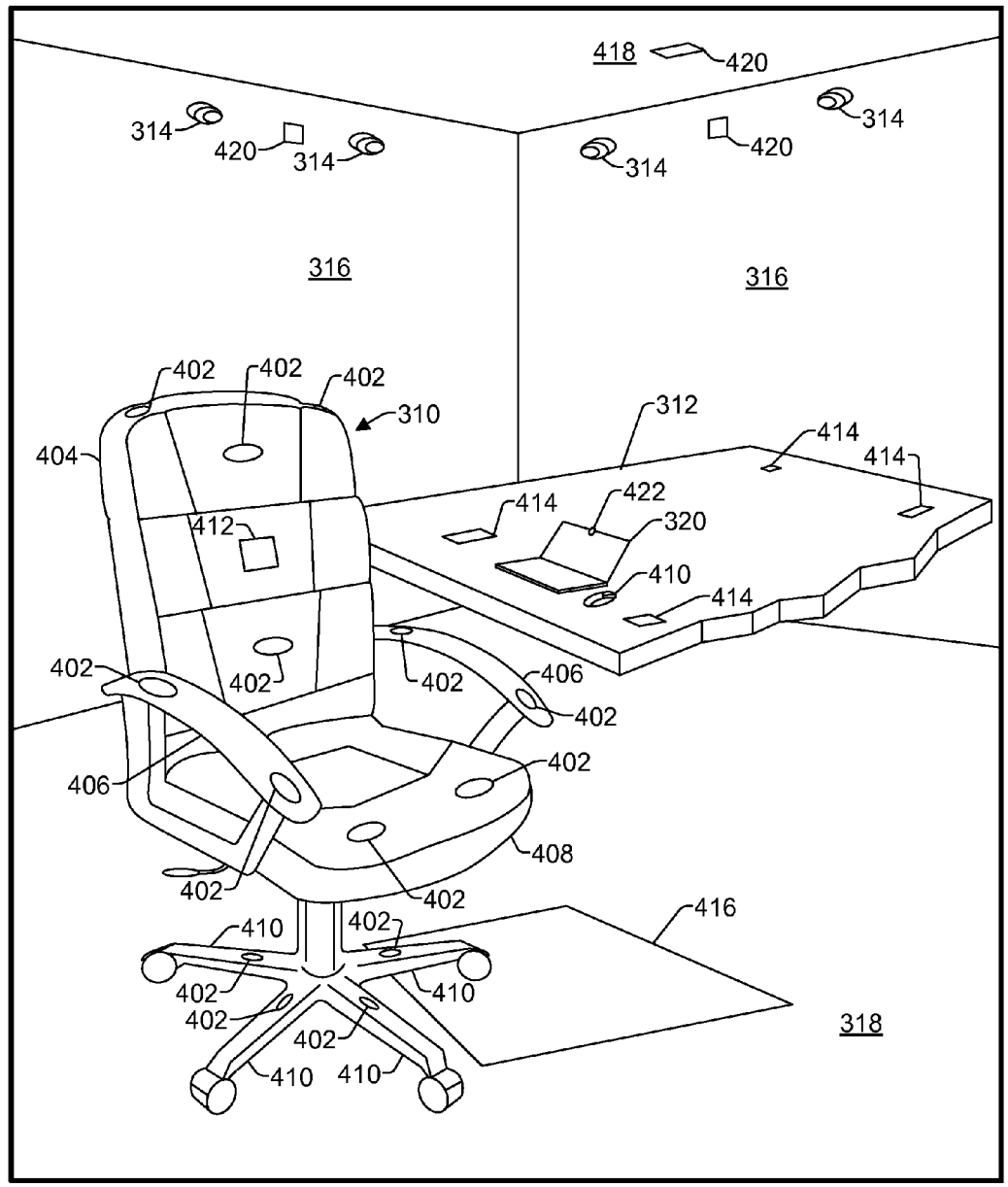
FIG. 4 depicts an example of sensor arrangements according to some implementations.

FIG. 4 illustrates an example of a possible sensor configuration according to some implementations herein. In this example, the chair 310 may include a plurality of sensors 402 located in the back 404, arms 406, seat 408 and legs 410 of chair 310. Sensors 402 may include a variety of sensors such as vibration or motion sensors, accelerometers, heart rate sensors, microphones, breathing rate sensors, body temperature sensors, and so forth. For example, chair 310 may detect movements of a participant sitting in the chair and these movements can be interpreted as being indicative of a certain reaction or disposition of the participant, such as frustration, excitement, fidgeting, or the like. Sensor 402 can also detect how much the chair is moving, rocking, swiveling, etc., for comparison with certain baselines to aid in detecting a reaction based on the activity level of an individual sitting in the chair.

Furthermore, chair 310 may also include one or more feedback mechanisms 412 for delivering feedback to one or more participants either based on individual reaction information or based on aggregated reaction information. For example, feedback mechanism 412 may include a device for delivering vibrations to a person sitting in the chair, providing heating or cooling to the chair, adjusting the posture of the chair, or for providing other suitable feedback or stimulus to a person sitting in the chair.

In addition, table 312 may be equipped with a plurality of sensors 414 also able to detect various aspects of participants such as vibration sensors, microphones or the like. Further, floor 318 may also be equipped with sensors such as a vibration or motion sensor 416 for detecting foot and leg movements and gestures. In addition, walls 316 and ceiling 418 may be outfitted with various sensors 420, such as motion detectors, microphones, infrared sensors, and the like, as well as video cameras 314.

The user computing device 320 may also be used as a sensing device. For example, user computing device 320 may include a microphone and camera 422 and various other sensors, such as in a keyboard. Further, in one implementation, a mouse 424 included with computing device 320 may include a pulse detector for detecting a heart rate of a participant that is using the mouse. Various other sensor arrangements will be apparent in light of the disclosure herein, and implementations are not limited to any particular sensor configuration or installation.

Figure 5:
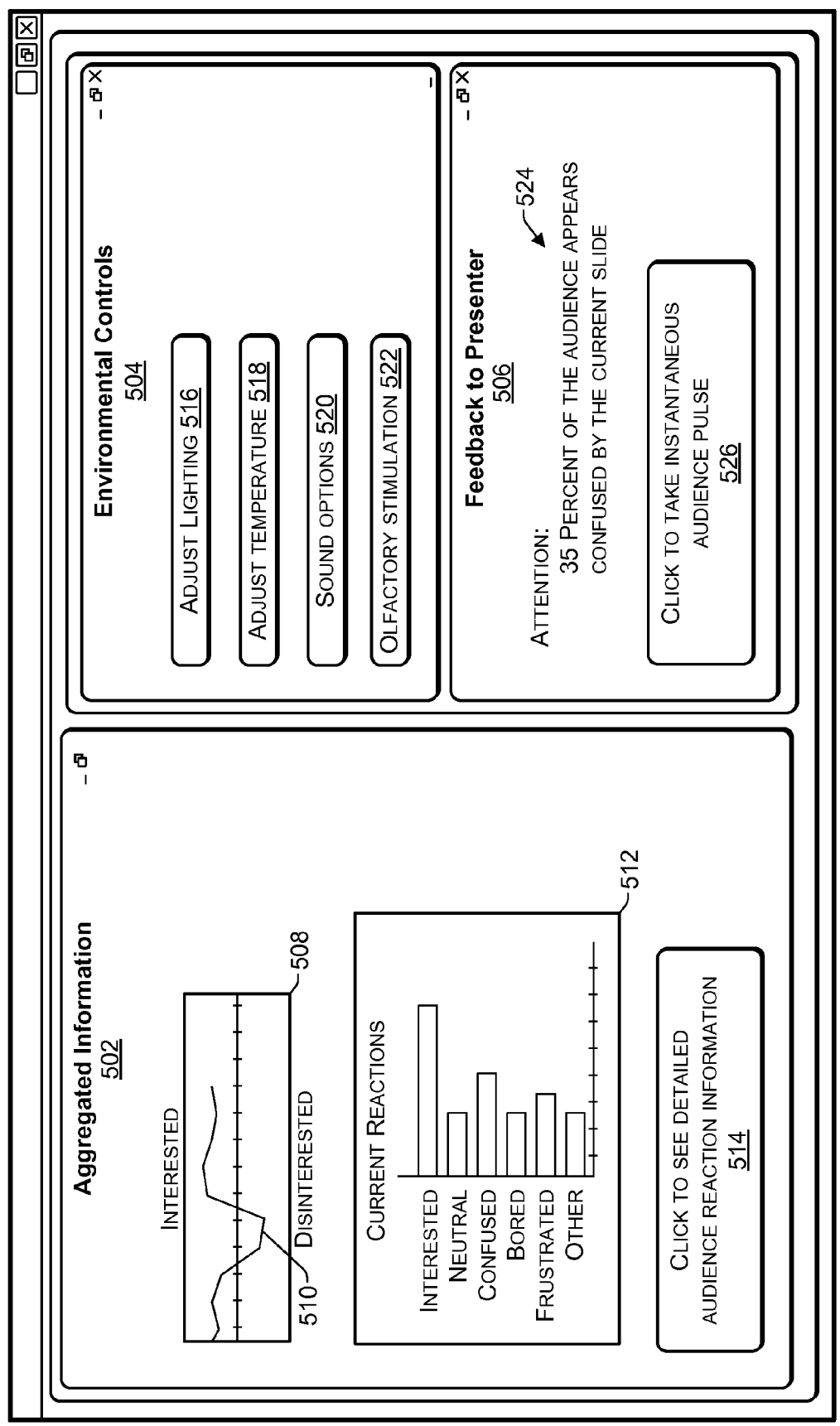
FIG. 5 depicts an example of a user interface according to some implementations.

FIG. 5 illustrates an example of a user interface 500 according to some implementations herein. For instance, the user interface 500 may be presented on the user computing device 320 of the presenter 306 or a meeting moderator while the presenter 306 is delivering the presentation. In the illustrated example, user interface 500 includes aggregated information 502, environmental controls 504, and feedback to presenter 506. Aggregated information 502 may include an overall reading of the audience disposition 508. For instance, the reactions of all of the audience members may be aggregated and averaged to give the presenter an indication of the current level of audience interest, engagement or the like. For example, certain detected reactions may be interpreted as demonstrating that a participant is not interested (e.g., bored, distracted etc.), while other detected reactions (e.g., interested, excited, etc.) may be interpreted as demonstrating that the participant is interested. Thus, when the audience is shown to be disinterested in the current topic of discussion e.g., as shown at location 510 in the feedback on the audience disposition 508, the presenter 306 or a meeting moderator may decide to alter the presentation, change the topic or carry out other actions such as controlling the environment to affect the audience's disposition.

Aggregated information may also include a breakdown of current reactions 512 of the audience members defined according to particular categories of reactions or dispositions. For example, the breakdown of current reactions 512 may show percentages of the audience that are interested, neutral, confused, bored, frustrated, or experiencing other reactions. Additionally, the aggregated information 502 may include a clickable button 514 or other option to view more detailed audience reaction information. For example, the aggregated information may also be broken down and presented as feedback according to any known demographics as registered in user's profile, e.g., men vs. women, age, job role/title, or other data that can be gleaned from the system, connecting with other systems, and so forth.

Implementations herein enable identification of presenters and presentations that are engaging to an audience. Similarly, implementations can identify presenters or presentations that can be improved. For example, when a particular portion of a presentation coincides with low audience interest, the presentation may be altered or improved on to address this issue. Further, if a presenter is shown to consistently have low audience interest or engagement, coaching and training techniques may be provided to improve the presenter's presentation skills. Additionally, the user computing device 320 of the presenter may have the presenter's presentation, such as slides or video content contained thereon as the presentation is being made. The system can receive a feed of the presentation from the presenter's computing device 320 and synchronize this feed with the reactions from the audience for providing immediate or subsequent feedback on the presentation content. Alternatively, the system 300 may use video cameras 314 and microphones in the room for synchronizing audience reactions with the presentation.

Environmental controls 504 may include options for adjusting lighting 516, adjusting temperature 518, sound options 520, or providing olfactory stimulation 522. In some implementations, these environmental controls may be configured to be triggered automatically in response to a particular audience reaction. For example, if the level of disinterest drops below a predetermined threshold, the lighting may be brightened the temperature adjusted or a sound may be produced to "wake up" the audience. For instance, a particular sound could become the "de facto sound" for a given emotion or mood detected. For example, a police siren sounds different from a fire engine siren, which sounds different from air raid/warning siren but all these sounds are distinctive sounds recognized by most members of the population for signifying a particular meaning. Similarly, a particular sound may be designated as a de facto sound for a particular audience reaction, thus creating a [stimuli=>behavior=>interpretation=>sound] chain reaction or process. In some implementations, this may effectively be a separate closed loop process carried out independent of other ongoing processes, such as aggregation. In other words, the presenter doing or saying something is the stimuli, the sensed physical conditions, movements, of the participants are the behavior, the system then performs an interpretation to infer a reaction, resulting in a sound as feedback. Upon receiving the sound as feedback, an action is taken by the presenter or the group, thereby closing the loop for the immediate process. Consequently, certain sounds may be produced in response to the detection of particular threshold levels of reactions by the audience thereby providing an audible signal to both the presenter and the members of the audience. For instance, if the system shows that a certain percentage of the audience over a predetermined threshold is confused, the system may produce a particular sound that indicates this to the audience and the presenter so that the confusion may be addressed. The thresholds for adjusting the environment automatically may be preset by the presenter, by the meeting organizer, or by default settings of the system 300. Furthermore, the environmental controls may also have the option of being manipulated manually by either the presenter or by a moderator, meeting organizer, or the like.

User interface 500 may also provide direct feedback to the presenter 506. For example, the feedback may include alerts or messages 524 when certain audience reactions are detected. Such messages may be based upon predetermined thresholds or other factors. For instance, when the audience confusion level reaches a certain threshold, a message may be sent to the presenter to notify the presenter of this so that the presenter can address the issue. Furthermore, the presenter 306 may have an option of cueing the system to instantly take a pulse from the sensors in the room and provide feedback, such as "how is everybody doing", or "is this making sense." In response, although the system may be regularly detecting input from the environment and providing feedback on a periodic basis, this sequence may be interrupted to take an immediate collection of data from sensors for providing immediate feedback to the presenter.

Furthermore, the user interface 500 may also be presented on the user computing devices 320 of a moderator or meeting manager. This would prevent the presenter 304 from possibly being distracted by the feedback and enable manual control of the environmental controls 504 by the moderator. Furthermore, the user interface 500 may also be presented on computing devices 320 of the members of the audience 304. In this case, the environmental controls 504 and feedback to presenter 506 may be eliminated from the user interface 500. Instead, user interface 500 may include, for example, the aggregated information 502 and also may include personal data regarding the particular individual using a particular user computing device 320. For example, the user interface 500 may display the reactions detected by the system for the particular individual. As mentioned above, this information may be retained as private and displayed only to that particular individual, or the individual may consent to share this information with others. Furthermore, in some implementations, a display device (e.g., display 308) may be provided in the room and be visible to the presenter and/or the audience members. The aggregated feedback can be shown on the display device in the form of a meter, gage, clock, or the like to provide an indication of the level of engagement of the audience as determined by the system.

Example Meeting Setting

Figure 6:
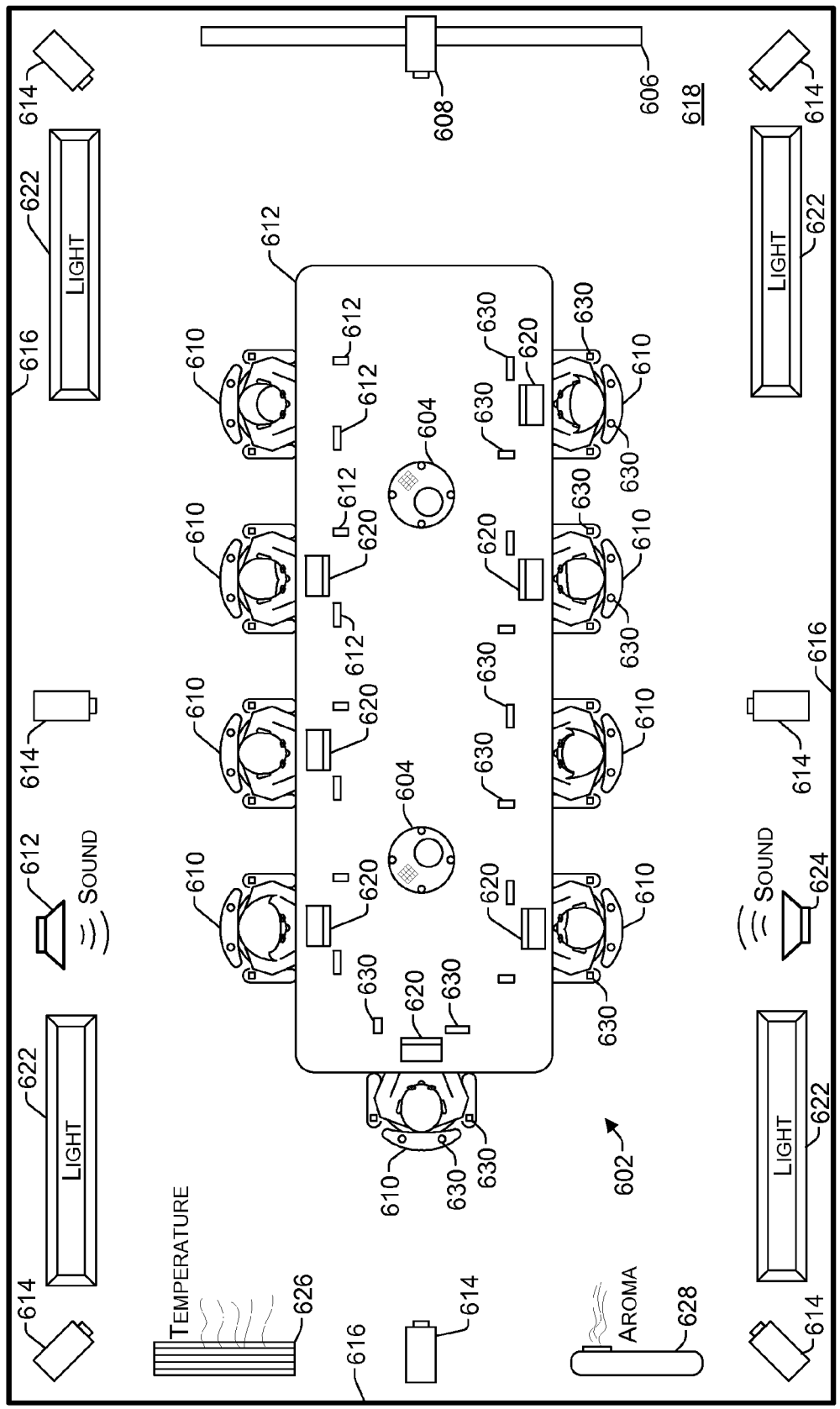
FIG. 6 depicts an example of a meeting room system according to some implementations.

FIG. 6 depicts another example illustrating a meeting room setting for a system 600 according to some implementations herein. Many components of system 600 may correspond to similar components of system 300 described above. For example, a plurality of participants 602 may be present in the meeting room during the meeting and the meeting room may also include the ability for teleconference or video conference communication with a plurality of additional remote participants (not shown in FIG. 6). For instance a videoconferencing system 604 may be provided including a display 606 for viewing the remote participants and at least one video camera 608 for delivering video to the remote participants. Further, the remote participants may be located in a room having a system 600 similar to that of FIG. 6.

The participants 602 and the remote participants may be seated in chairs 610 at tables 612 for conducting a meeting or other interaction. Further, the system 600 may be configured with a variety of different sensors for detecting the reactions of the participants 602. For example, the sensors may include a plurality of video cameras 614, and numerous other sensors that may be attached to the chairs 610, tables 612, walls 616, floor 618, ceiling (not shown), user computing devices 620 of the participants, or other suitable locations, as described above. The system 600 may further include a plurality of environmental components that can be controlled manually or automatically for adjusting the environment of the meeting room. Examples of the environmental components may include lighting 622, speakers 624 or other sound generators, ventilation devices 626 or other devices for controlling the temperature and air flow in the room, an aroma generator 628 able to generate various aromas, and other suitable environmental components.

Chairs 610 and tables 612 may correspond to chairs 310 and tables 312, respectively, described above, and may include a plurality of sensors 630, such as microphones, body temperature sensors, pulse or heart rate detectors, vibration detectors, body movement sensors and other devices for detecting physical, physiological and biological aspects of the participants 602. Further, in some implementations, the participants can have user computing devices 620, corresponding to user computing devices 320 described above, that communicate with and participate in the system 600.

As an example, the participants are invited to consent to having their reactions detected. Those participants who do not consent will not have their physical conditions sensed or their reactions detected. For example, user computing devices 620 may be used to request consent, or if not all participants have user computing devices 620, assigned seating may be used to determine which participants have consented. Further, according to some implementations, chairs 610 may include controls for enabling a participant to indicate consent.

While the meeting is conducted, the reactions of the participants 302 who have consented, i.e., both local participants and remote participants, may be detected by the system 600 in the manner described above. For instance, the system 600 can interpret the participant's reactions and provide feedback to one or more of the participants 602. In some implementations, information on detected reactions and feedback may be provided only to the participant to whom the feedback pertains. In other implementations, the participants may choose to share their information, either anonymously, or openly.

Figure 7:
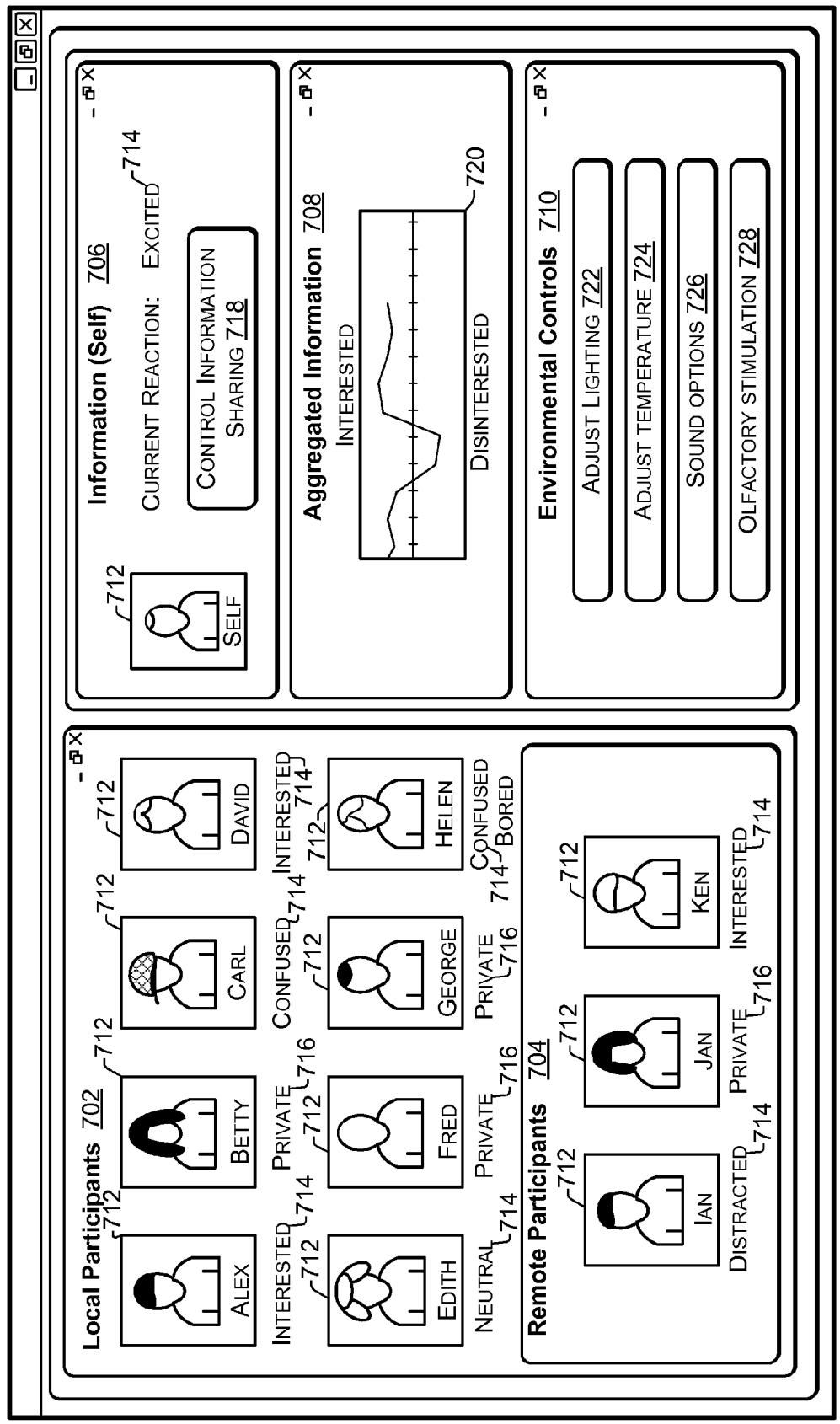
FIG. 7 depicts another example of a user interface according to some implementations.

FIG. 7 illustrates an example of a user interface 700 that may be implemented according to the example of FIG. 6. As illustrated, user interface 700 includes a window showing local participants 702 and a window showing remote participants 704. User interface 700 may also include information on the particular user of the user interface 700 as information on self 706. User interface 700 may further include aggregated information 708 and environmental controls 710. For each local and remote participant, user interface 700 may display an image and/or name 712 of the participant. For those participants who have chosen to share their reaction information, user interface 700 may also display in conjunction with the image and/or name 712 a detected reaction or disposition 714 of the particular participant. In some cases, the participants may choose not to share his or her information, or may have chosen not to consent to having their reactions detected, and in this case the user interface may show that the information is private 716. Further, it is also possible for the system 600 to interpret more than one reaction from the participants, as illustrated by participant Helen who is shown as having a reaction 714 that is both confused and bored. Consequently, it may be seen that implementations herein enable participants in one location to be made aware of a disposition or reaction of participants not only at their own location but also at one or more remote locations.

Further, as mentioned above, multiple levels of consent can be used by participants. For example in some implementations, the user interface 700 may appear different to each participant depending on who has consented to share reaction information with whom. As an example, suppose participant Alex has chosen to only share reaction information with other participants who have also consented to share their reaction information. In this implementation, participant Carl, who has also consented to sharing his reaction information, is able to see the reaction information of Alex, while participant Betty is not. Numerous other sharing scenarios are possible. For example, a participant can choose to share reaction information only for a particular topic, task, context, etc., can select specific individuals to share some reaction information with, while not sharing with other individuals, can share anonymously with the system, such as for being included in the aggregated information 708, and the like. Further, participants may decide to share their reaction information after an interaction, such as after having a chance to review the inferred reactions, etc.

The information on self 706 may include a current detected reaction of the particular individual and may also provide a button 718 or other interface to access a mechanism to enable the individual to control how much of his or her information is shared with others attending the meeting and or retained in data storage. As mentioned above, implementations herein may enable the participants to have complete control over their own personal information, may enable participants to decide how much information to share with others, may maintain participants' information in an anonymous manner, or the like.

The aggregated information 708 may include an indication of the participants' overall reactions or dispositions 720. For instance, the reactions of all the all participants may be aggregated and averaged to give the participants an indication of the current level of participant interest or engagement. For example, certain detected reactions may be interpreted as demonstrating that a participant is not interested (e.g., bored, distracted etc.), while other detected reactions (e.g., interested, excited, etc.) may be interpreted as demonstrating that the participant is interested. Thus, when the participants are shown by the aggregated information 708 to be disinterested in the current topic of discussion, the meeting moderator or the participants themselves may decide to change the topic or carry out other actions such as controlling the environment to affect the participants' dispositions.

The environmental controls 710 may correspond to the environmental controls 504 discussed above with reference to FIG. 5 and include options for adjusting lighting 722, adjusting temperature 724, sound options 726, or providing olfactory stimulation 728. In some implementations, these environmental controls may be configured to be triggered automatically in response to a particular participant reaction thresholds. For example, if the aggregated level of disinterest falls below a predetermined threshold, the lighting may be brightened, the color changed, the temperature in the room may be adjusted, or a sound may be produced. In some implementations, the environmental controls may only be available to certain participants, such as a meeting coordinator, or the environmental controls may be accessible on with administrator privileges.

Focus Group Example

Implementations herein may also be applied in other situations and environments, such as focus groups, live marketing surveys, and the like. FIG. 8 illustrates example results 800 for discussion purposes of a test marketing group according to some implementations. For example, a group of participants that has consented to having their reactions detected may be poled using a system such as the system 300, 600, described above. In this example, a plurality of participants in the group are presented with a series of candidate movie titles 802, and the system 300, 600 can detect the reactions of the participants for determining which candidate movie title 802 has the most appeal to the participants. The group may provide their own responses to a candidate title, and this information can be compared with reactions detected by the system, such as for verifying accuracy of the responses.

As illustrated, the detected reactions 804 of the participants to each movie title can be categorized as to whether the participants agree with a particular title, disagree and/or are confused by a particular title. For instance, the results 800 show that only 20 percent of the participants showed reactions that indicated agreement with Movie Title 1, while 65 percent appeared confused, thus leading to a conclusion that the majority disagree with the Movie Title 1 as indicated by the "X". Movie Title 3 was similarly not agreeable to the participants, but Movie Title 2 was agreeable, with 76 percent of the audience displaying a reaction indicating agreement. Further, while specific examples have been provided herein for discussing the various implementations, the implementations are not limited to the specific examples disclosed.

Example System Architecture

Figure 9:
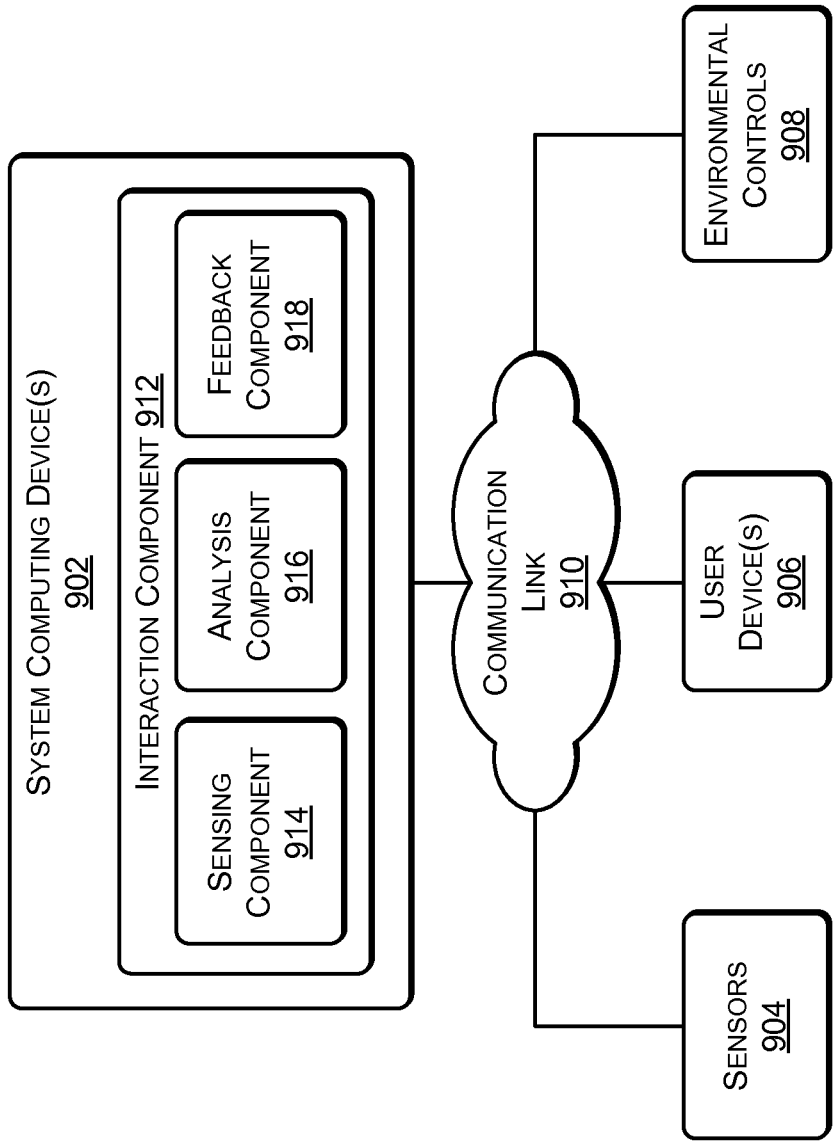
FIG. 9 depicts an example system architecture according to some implementations.

FIG. 9 illustrates a block diagram of an example system architecture 900 according to some implementations. In the illustrated example, architecture 900 includes at least one system computing device 902 able to communicate with sensors 904, one or more user devices 906, and one or more environmental controls 908. In some implementations, user devices 906 may be user computing devices, such as user computing devices 320, 620 described above, which may be any of desktop computing devices, laptops, mobile computing devices, hand-held computing devices, cell phones, smart phones, personal digital assistants, or other suitable computing devices. However, in other implementations, user devices 906 may merely be a display or other output device for presenting feedback, or an input device for receiving participant consent to having their reactions detected. In some implementations, system computing device 902 communicates through a communication link 910. Communication link 910 may any of a direct connection, a local area network (LAN), a wide area network (WAN), a wireless network, or other suitable communication network enabling communication between system computing device 902 and sensors 904, user devices 906 and environmental controls 908. Further, in other implementations, communication link 910 may be the Internet and sensors 904, user devices 906 and environmental controls 908 can be configured to send and receive instructions over the Internet.

System computing device 902 may include an interaction component 912 for implementing the functions described herein. Interaction component 912 may include a sensing component 914 for receiving and storing information from sensors 904, controlling sensors 904, and the like. Interaction component 912 may further include an analysis component 916 for organizing and analyzing the information collected by the sensors 904. As one example, analysis component can correlate the information collected for a participant and combine indicators provided by each piece of sensor data collected for that participant for identifying one or more reactions or emotions displayed by the participant. Further, the analysis component 914 can provide analysis of accumulated information collected over time for identifying trends and patterns in human behavior. Interaction component 912 may further include a feedback component 918 for providing feedback to one or more participants. For instance, the analysis component can provide the analysis data to the feedback component 918. The feedback component can then provide appropriate feedback based on system settings or participant instructions. For example, in some implementations, feedback component 918 provides feedback in real time or at later points in time to user devices 906. In some implementations, feedback component 918 may apply feedback to environmental controls 908 for controlling an environment of the participants.

While the foregoing sets forth an example of a system architecture 900 for implementing the reaction detection and feedback herein, this is merely one example of a possible system, and implementations herein are not limited to any particular system configuration. For example, any or all of sensing component 914, analysis component 916 and feedback component 918 may be implemented in separate computer devices, may be implemented in user computing devices, or the like. Thus, the implementations disclosed herein may be deployed in any suitable system or environment in which it is desirable to determine human reactions.

System Computing Device

Figure 10:
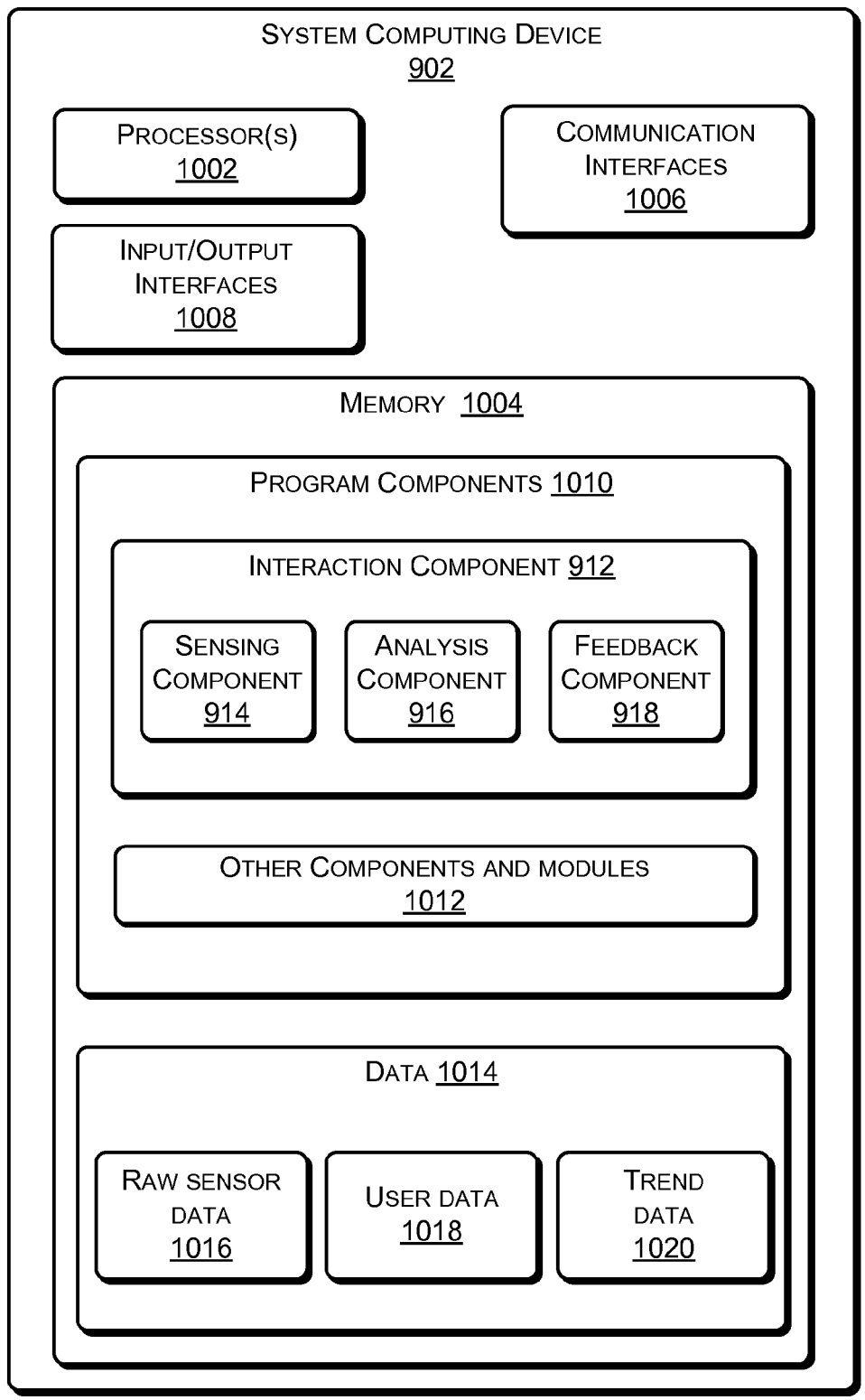
FIG. 10 depicts an example of a system computing device according to some implementations.

FIG. 10 illustrates an example of system computing device 902 that can be used to implement components and modules for the reaction detection and feedback herein. In the illustrated example, system computing device 902 includes at least one processor 1002 communicatively coupled to a memory 1004, one or more communication interfaces 1006, and one or more input/output interfaces 1008. The processor 1002 can be a single processing unit or a number of processing units, all of which may include multiple computing units or multiple cores. The processor 1002 may be implemented as one or more microprocessors, microcomputers, microcontrollers, digital signal processors, central processing units, state machines, logic circuitries, and/or any devices that manipulate signals based on operational instructions. Among other capabilities, the processor 1002 can be configured to fetch and execute computer-readable instructions stored in the memory 1004 or other non-transitory computer-readable storage media.

The memory 1004 can include any computer-readable storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks (e.g., CD, DVD), storage arrays, storage area networks, network attached storage, or the like, or any combination thereof The memory 1004 stores computer-readable processor-executable program instructions as computer program code that can be executed by the processor 1002 as a particular machine programmed for carrying out the processes and functions described according to the implementations herein.

The communication interfaces 1006 facilitate communication between the system computing device 902, the sensors 904, user devices 906 and environmental controls 908. The communication interfaces 1006 can facilitate communications within a wide variety of networks and protocol types, including wired networks (e.g., LAN, cable, etc.) and wireless networks (e.g., WLAN, cellular, satellite, etc.), the Internet and the like, any of which may correspond to the communication link 910. Communication interfaces 1006 can also provide communication with external storage (not shown), such as in a storage array, network attached storage, storage area network, etc., for storing user data, raw sensor data, or the like.

Memory 1004 includes a plurality of program components 1010 stored therein and executable by processor 1002 for carrying out implementations herein. Program components 1010 include the interaction component 912. Interaction component 912 includes the sensing component 914, the analysis component 916, and the feedback component 918, as discussed above. Memory 1004 may also include a number of other components and modules 1012, such as an operating system, communication software, drivers, or the like.

Memory 1004 also includes data 1014 that may include raw sensor data 1016. As described herein, sensing component 914 may be executed by processor 1002 to collect raw sensor data 1016 from sensors 904. Analysis component 916 correlates and analyzes the collected sensor data to generate reaction information for participants as user data 1018. Analysis component 916 may also apply user data collected over time to create cumulative pattern or trend data 1020. Further, while an example implementation of a system computing device architecture has been described, it will be appreciated that other implementations are not limited to the particular architecture described herein. For example, one or more of sending component 914, analysis component 916 and/or feedback component 918 might be implemented on one or more separate computing devices. Other variations will also be apparent to those of skill in the art in light of the disclosure herein.

User Computing Device

Figure 11:
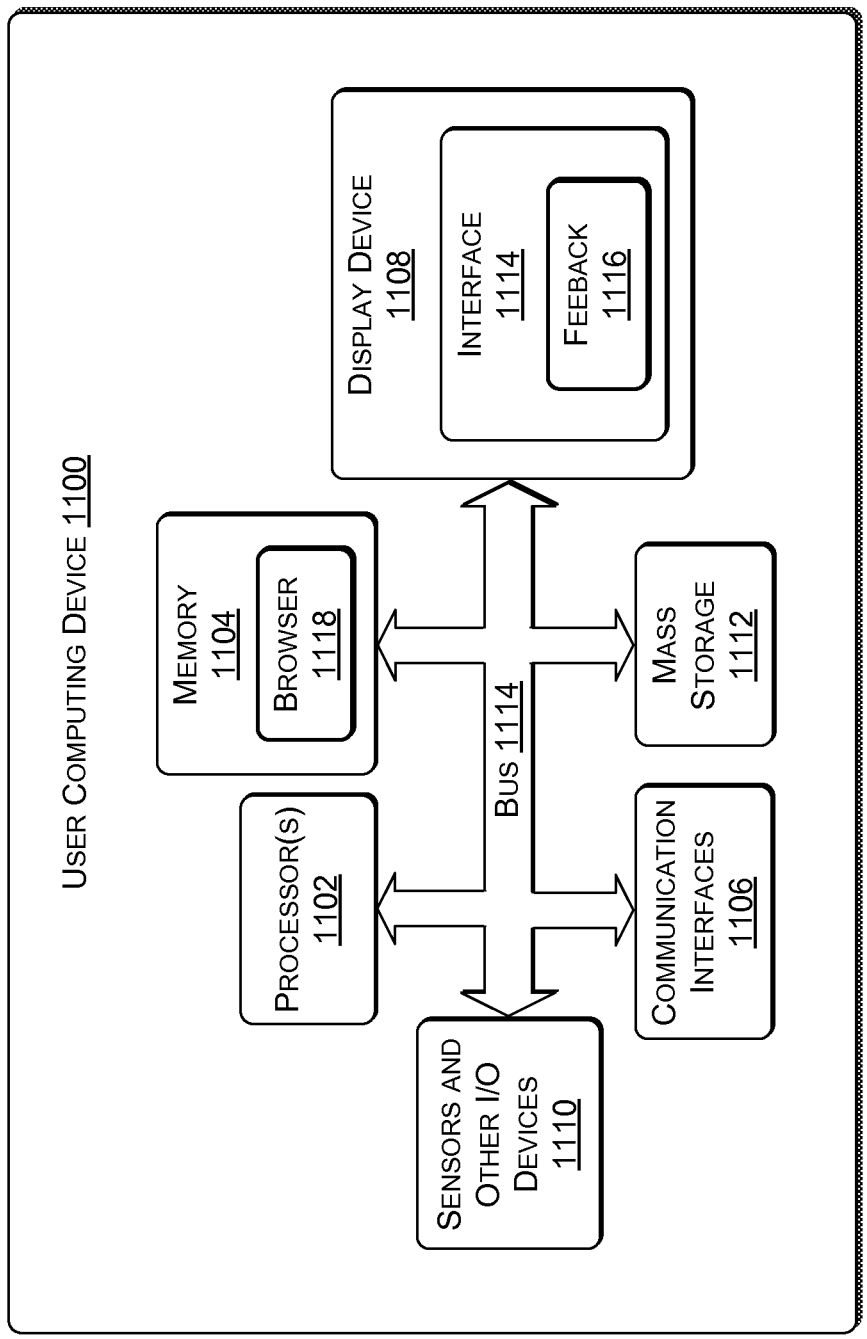
FIG. 11 depicts an example of a user computing device according to some implementations.

FIG. 11 illustrates an example configuration of a user computing device 1100 that may correspond to any of user computing devices 320, 620 or user devices 906. The user computing device 1100 may include at least one processor 1102, a memory 1104, communication interfaces 1106, a display device 1108, sensors and other input/output (I/O) devices 1110, and one or more mass storage devices 1112, all able to communicate through a system bus 1114 or other suitable connection.

The processor 1102 may be a single processing unit or a number of processing units, all of which may include single or multiple computing units or multiple cores. The processor 1102 can be implemented as one or more microprocessors, microcomputers, microcontrollers, digital signal processors, central processing units, state machines, logic circuitries, and/or any devices that manipulate signals based on operational instructions. Among other capabilities, the processor 1102 can be configured to fetch and execute computer-readable instructions or processor-accessible instructions stored in the memory 1104, mass storage devices 1112, or other non-transitory computer-readable storage media.

Memory 1104 and mass storage devices 1112 are examples of computer-readable storage media for storing instructions which are executed by the processor 1102 to perform the various functions described above. For example, memory 1104 may generally include both volatile memory and non-volatile memory (e.g., RAM, ROM, or the like). Further, mass storage devices 1112 may generally include hard disk drives, solid-state drives, removable media, including external and removable drives, memory cards, Flash memory, floppy disks, optical disks (e.g., CD, DVD), or the like. Both memory 1104 and mass storage devices 1112 may be collectively referred to as memory or computer-readable storage media herein. Memory 1104 is capable of storing computer-readable, processor-executable program instructions as computer program code that can be executed on the processor 1102 as a particular machine configured for carrying out the operations and functions described in the implementations herein.

The user computing device 1100 can also include one or more communication interfaces 1106 for exchanging data with other devices, such as via a network, direct connection, or the like, as discussed above. The communication interfaces 1106 can facilitate communications within a wide variety of networks and protocol types, including wired networks (e.g., LAN, cable, etc.) and wireless networks (e.g., WLAN, cellular, satellite, etc.), the Internet and the like.

The display device 1108, such as a monitor, may be included in some implementations for displaying information to users. For example, display device 1108 can display an interface 1114 for presenting feedback 1116 according to the implementations described herein. For example, interface 1114 may be generated by a browser 1118 or other local software implemented in memory 1104 and able to communicate with system computing device 902. Sensors and other I/O devices 1110 may include the sensors described in the implementations above, such as a video camera, microphone, vibrations sensors, biological and physiological sensors, etc. Sensors and other I/O devices 1110 may further include devices that receive various inputs from a user and provide various outputs to the user, such as a keyboard, remote controller, a mouse, audio output devices, and so forth. Further, while an example user computing device configuration and architecture has been described, other implementations are not limited to the particular configuration and architecture described herein.

Example System-Side Process

Figure 12:
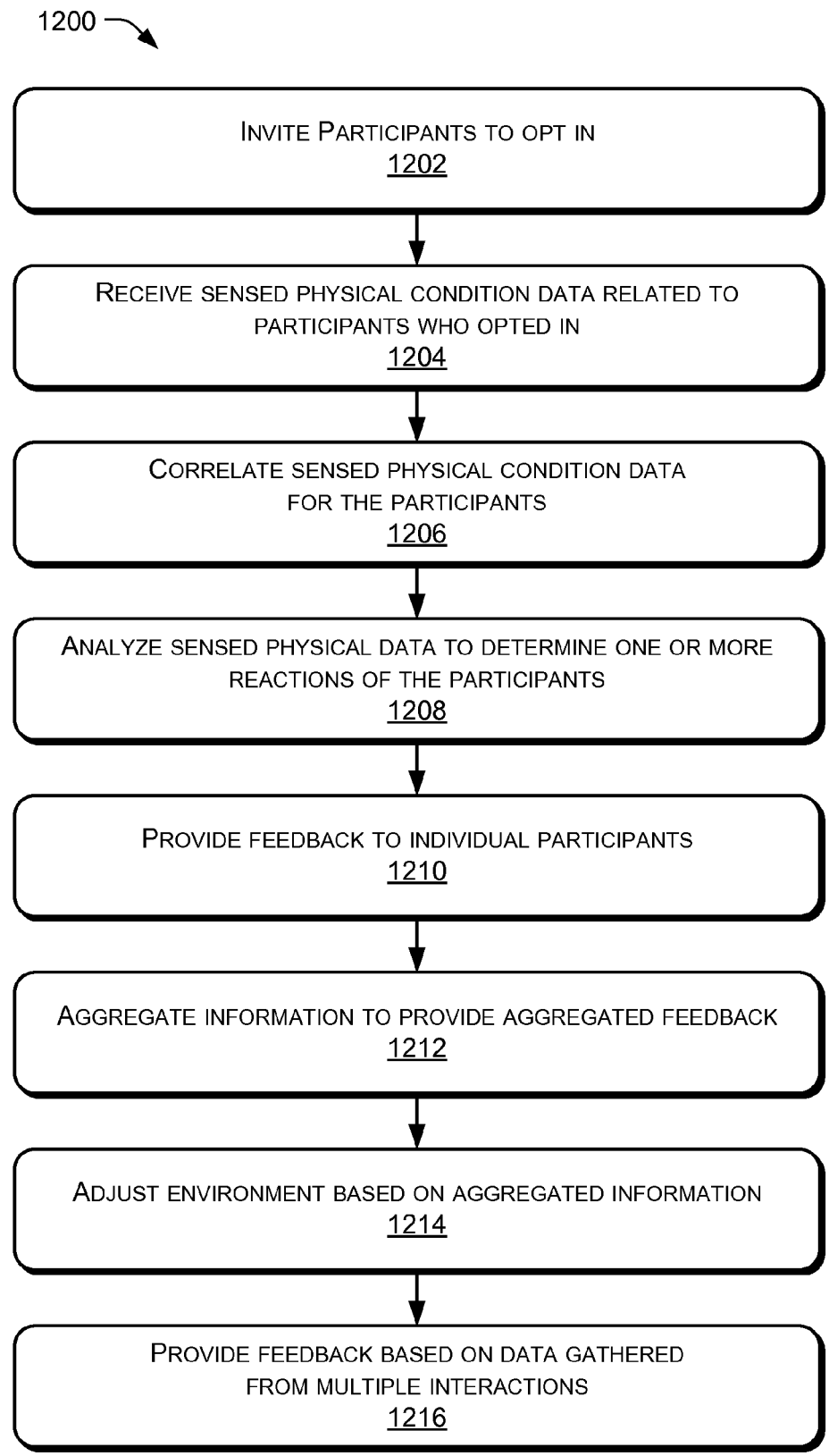
FIG. 12 depicts a flow diagram of an example process for detecting reactions and providing feedback according to some implementations.

FIG. 12 illustrates an example of a process 1200 for detecting reactions and providing feedback according to some implementations herein. In the flow diagram, the operations are summarized in individual blocks. The operations may be performed in hardware, or as processor-executable instructions (software or firmware) that may be executed by one or more processors. Further, the process 1200 may, but need not necessarily, be implemented using the systems, environments and interfaces of FIGS. 3-11. Consequently, by way of explanation, and not limitation, the process 1200 is described in the context of FIGS. 3-11.

At block 1202, participants are invited to opt in or consent to having their reaction information sensed and collected. For those participants that consent, the sensors are made active to collect information for sensing a condition of the participants. For those individuals who do not consent, reaction information is not collected.

At block 1204, sensors are used to physical conditions from participants who gave their consent. For example, as described above, a plurality of different types of sensors may be used to detect physical conditions of participants, such as movement, expressions, physiological and biological aspects for use in detecting one or more reactions of the participants.

At block 1206, the collected sensor data is correlated for each participant. For example, the raw sensor data for each participant is collected by the sensing component and provided to the analysis component which correlates the raw sensor data from some sensors with other raw sensor data from other sensors for each particular participant who gave consent.

At block 1208, the correlated sensor data is analyzed to determine one or more reactions of each of the participants. For example, the correlated sensor data is compared with baseline data across a number of different physical, physiological and biological aspects for determining one or more reactions that are most likely based on the collected sensor data.

At block 1210, feedback may be provided in real-time to the participant's in a number of different ways. For example, each individual participant may be provided with feedback regarding the participant's own reaction information. In other implementations, when consent has been granted to share the reaction information, a participant's reaction information may be shared with one or more other participants.

At block 1212, the participant information is aggregated to create an overall indication of the reactions of a plurality of the participants. For example, the reactions detected for the participant's may be aggregated and averaged to determine an overall reaction of an audience to a particular interaction. This aggregated information can be provided to a presenter or other individual, such a meeting moderator in real time as feedback on the interaction to assist the presenter, or the like. The aggregated information may also or alternatively be provided at a later point in time, following the interaction, such as for identifying area of a presentation for improvement.

At block 1214, based on the aggregated information, in some implementations the environment of the participants may be adjusted automatically or manually to attempt to influence the reactions of the participants. For example, as described above, the lighting of the room may be brightened or dimmed, the color changed, the temperature in the room may be adjusted, certain sounds may be produced, certain aromas may be generated, and so forth.

At block 1216, with participant consent, the reaction information collected may be stored and used along with other accumulated reaction information collected from other interactions for determining patterns and trends such as for research purposes, improving presentation conditions, optimizing meeting environments, and the like. For example, the cumulative information may be provided to individuals to enable individuals to make a number of different decisions such as whether to attend particular meetings, take particular actions, adjust their behavior, etc. Further, the cumulative information may be used by meeting planners for determining optimal environments for conducting meetings or particular subjects or for particular audiences.

Information Control and Management

Figure 13:
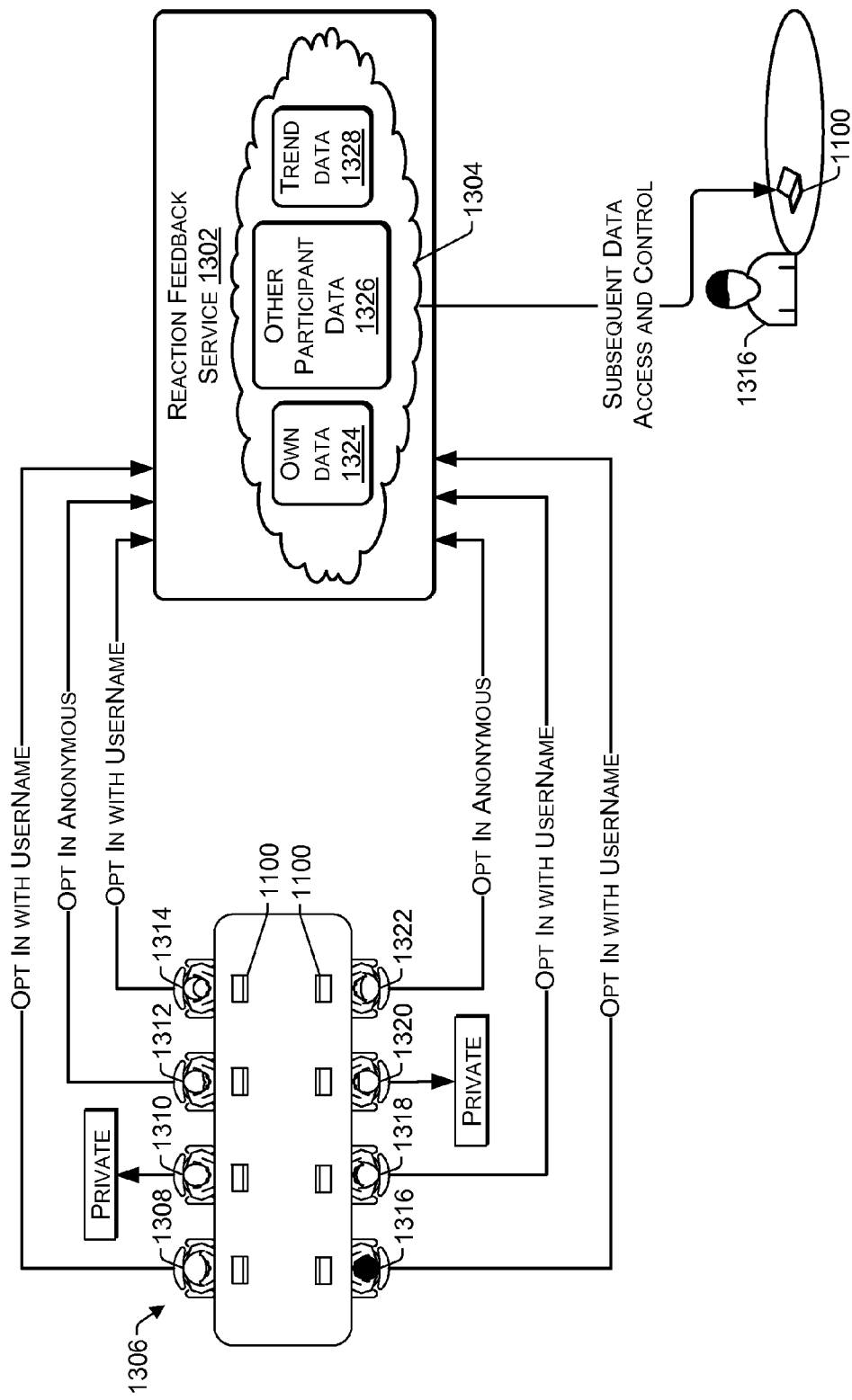
FIG. 13 depicts an example information control framework according to some implementations.

FIG. 13 illustrates a framework 1300 for reaction information control and management according to some implementations herein. A reaction feedback service 1302 may be provided to effect a personal cloud 1304 for secure storage and management of reaction information collected for each user. In some implementations, reaction feedback service 1302 may be a subcomponent of feedback component 918. For example, the personal cloud 1304 for each user may be provided by one or more of system computing device(s) 902, user computing devices 1100, a combination thereof, or other suitable computing devices. The personal cloud 1304 for each user can provide the user with complete control over the user's reaction information. As will be described below, the user can control and manage the access of others to the reaction information based on various levels and types of granularity such as identity, time, task, context, reaction detected, etc.

In the illustrated example, an interaction, such as a meeting 1306 includes a plurality of participants 1308-1322 that take part in the meeting 1306. As discussed above, the participants may decide how much, if any, of their reaction information is collected and shared during the meeting 1306. In the example, participants 1308, 1314, 1316, 1318 have chosen to opt in with their usernames so that their reaction information is collected and stored within the system, and can be associated with each particular participant by username, or the like. Further, participants 1312, 1322 have chosen to opt in anonymously to have their reaction information collected and stored anonymously. For example, as discussed above, anonymous information may be used as aggregated reaction information for a particular interaction, and may also be used for identifying patterns and trends in reaction information collected over a plurality of interaction sessions. Additionally, in the example, participants 1310, 1320 have chosen to remain private and not have their reaction information collected.

As the meeting is conducted, reaction information is collected and stored, as described above. A participant may choose during the meeting 1306 to change his or her reaction information consent or preferences, such as changing from opt in with username to anonymous or to private. This can be accomplished, for example, using a control interface on user computing device 1100, as describe additionally below, or by other means. In addition, during and after the meeting, participants may change their sharing settings to control access to their reaction information, such as selecting particular individuals able to view the reaction information. The personal cloud 1304 enables a particular user to control dissemination of or access to the user's information based upon a variety of different conditions and settings, such as by permission granted to particular users, the time at which the information was collected, the context in which the information was collected, a certain task being performed when the information was collected, a certain emotion or reaction interpreted, or other levels of granularity. For example, a participant may consent to have his or her reactions detected for a particular topic or for a specified time. A participant may choose to share his or her reaction information with one or more selected participants, but not with other participants or the system.

Participants may decide during or after the meeting to change their sharing settings, such as by using a control interface presented on a user computing device 1100.

Following the meeting, a participant, such as illustrated participant 1316, may wish to access the reaction information collected and analyzed during the meeting, such as to obtain a better understanding of the meeting dynamics, determine how he or she was perceived as reacting during the meeting, or the like. The personal cloud 1304 provides participant 1316 with access to his or her own reaction information data 1324. The personal cloud 1304 provides also provides access to other participant data 1326 which is the reaction information of the other participants that have opted in to sharing their reaction information either by name or anonymously with participant 1316 specifically or with all participants. The personal cloud 1304 also may provide participant 1316 with access to trend data 1328 that can provide information on any identified patterns or trends based on the meeting 1306 and any previous meetings or interactions.

Participant 1316 is able to choose with whom to share all or a portion of the participant 1316 own data 1324. For example, participant 1316 may have opted in to having his or her reaction information collected, but may have not specified that any of the reaction information data 1324 actually be shared with other participants or the system. For example, participant 1316 may wish to review the interpreted reaction information before deciding whether to share the reaction information. In some implementations, participant 1316 may choose to share the reaction information anonymously with just the system, but by name with none or only some of the other participants. Additionally, the system may provide participant 1316 with a request interface that enables the individual to request access to reaction information of others, such as according to various levels of granularity, such as reactions of a particular individual, reactions of attendees of a particular meeting, reactions on a particular topic, reactions at a particular location, etc. Further, individuals can be provided with a record or audit of who has accessed or received their reaction information, and any actions taken with the information. For example, controls may be provided that limit how long others are able to access the reaction information, how others are able to use the information, in what context the information may be accessed, and so forth. Also, the user interface may provide detailed tracking of reaction information to enable auditing of how the information has been used. Many other sharing variations will also be apparent in light of the disclosure herein.

Figure 14:
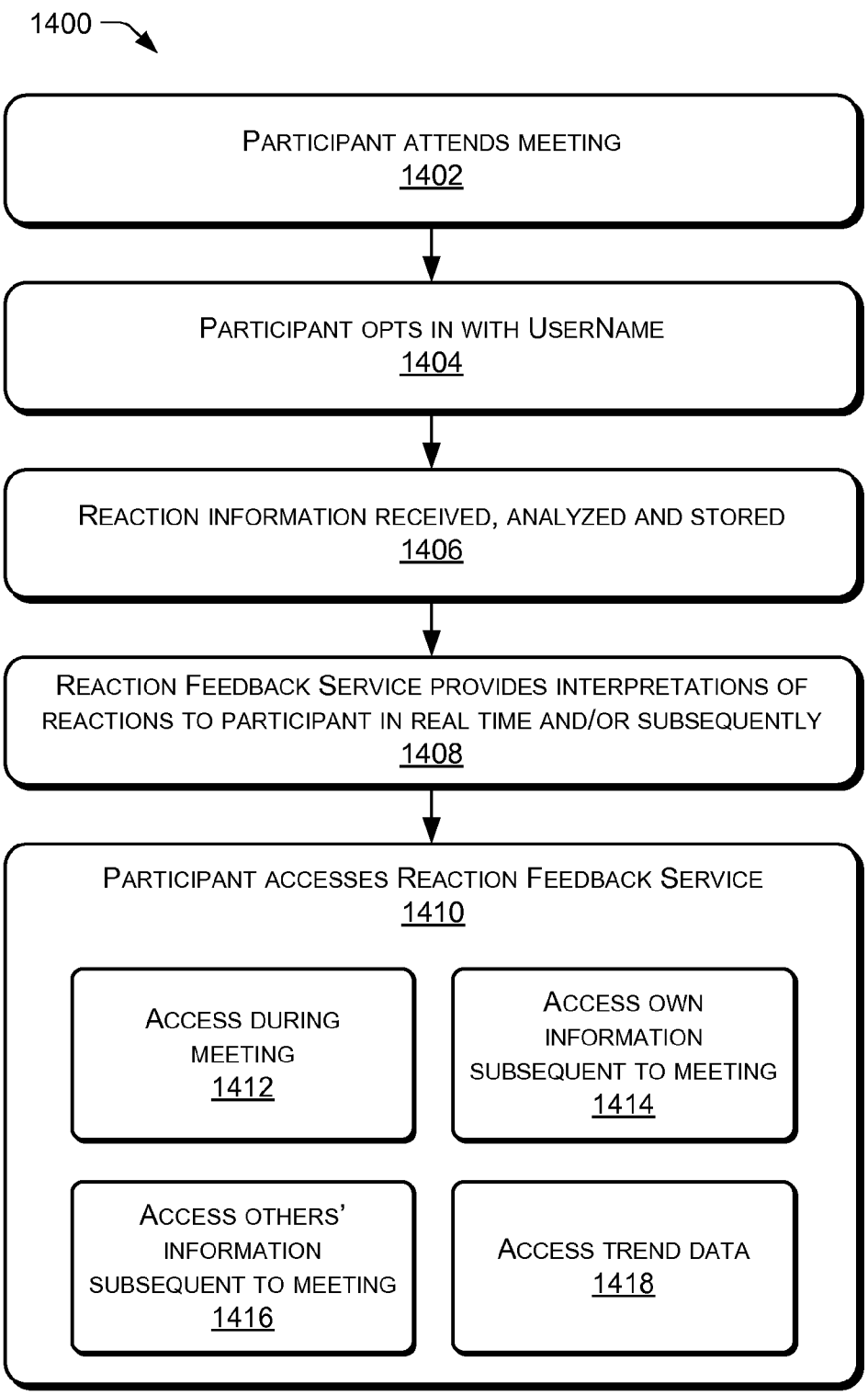
FIG. 14 depicts a flow diagram of an example user-side process according to some implementations.

FIG. 14 illustrates an example of a process 1400 for detecting reactions and providing feedback according to some implementations herein. In the flow diagram, the operations are summarized in individual blocks. The operations may be performed in hardware, or as processor-executable instructions (software or firmware) that may be executed by one or more processors.

At block 1402, a participant attends a meeting or participates in an interaction with other participants in the presence of a system able to detect physical body signals indicative of reactions and emotions of the participant, such as the systems described above with reference to FIGS. 3 and 6.

At block 1404, the participant opts in with username to have his or her reaction information collected and stored by the system.

At block 1406, during the meeting or other interaction, the participant's reaction information is received, analyzed and stored by the system, as described above.

At block 1408, the reaction feedback service is able to provide the interpretations of reactions to the participants in real-time and/or subsequently to the interaction.

At block 1410, the participant accesses the reaction feedback service to control and manage the access to and dissemination of the reaction information detected and inferred during the interaction.

At block 1412, the participants can access the reaction feedback service during the meeting, such as through the use of a user computing device 1100, to review their inferred reaction interpretations. Thus, the reaction feedback service can provide the participants who opted in with feedback regarding the participants' reactions inferred during the meeting or other interaction. The participants are also able to decide during the meeting whether to share their reaction information with other participants. Further, if other participants choose to share their reaction information with a particular participant during the meeting, this information can also be provided to the particular participant during the meeting or thereafter.

At block 1414, the participants access their reaction information subsequently to the meeting or interaction, such as to review the meeting and better understand the dynamics of interactions that took place during the meeting, or to determine how others may have perceived them as reacting during the meeting. The participant can also decide subsequently to share some or all of their inferred reactions with other participants, the system, or the like.

At block 1416, the participants can also access reaction information of other participants that has been provided to them subsequent to the meeting. For example, other participants may decide after the meeting to share their reaction information with a particular participant, and this information is provided to the particular participant either during or subsequent to the meeting, depending on when the decision to share the information is made.

At block 1418, the participant is also able to access interaction analytic trend or pattern data that can include reaction information collected during the meeting and reaction information collected from one or more other meetings or interaction sessions.

Figure 15:
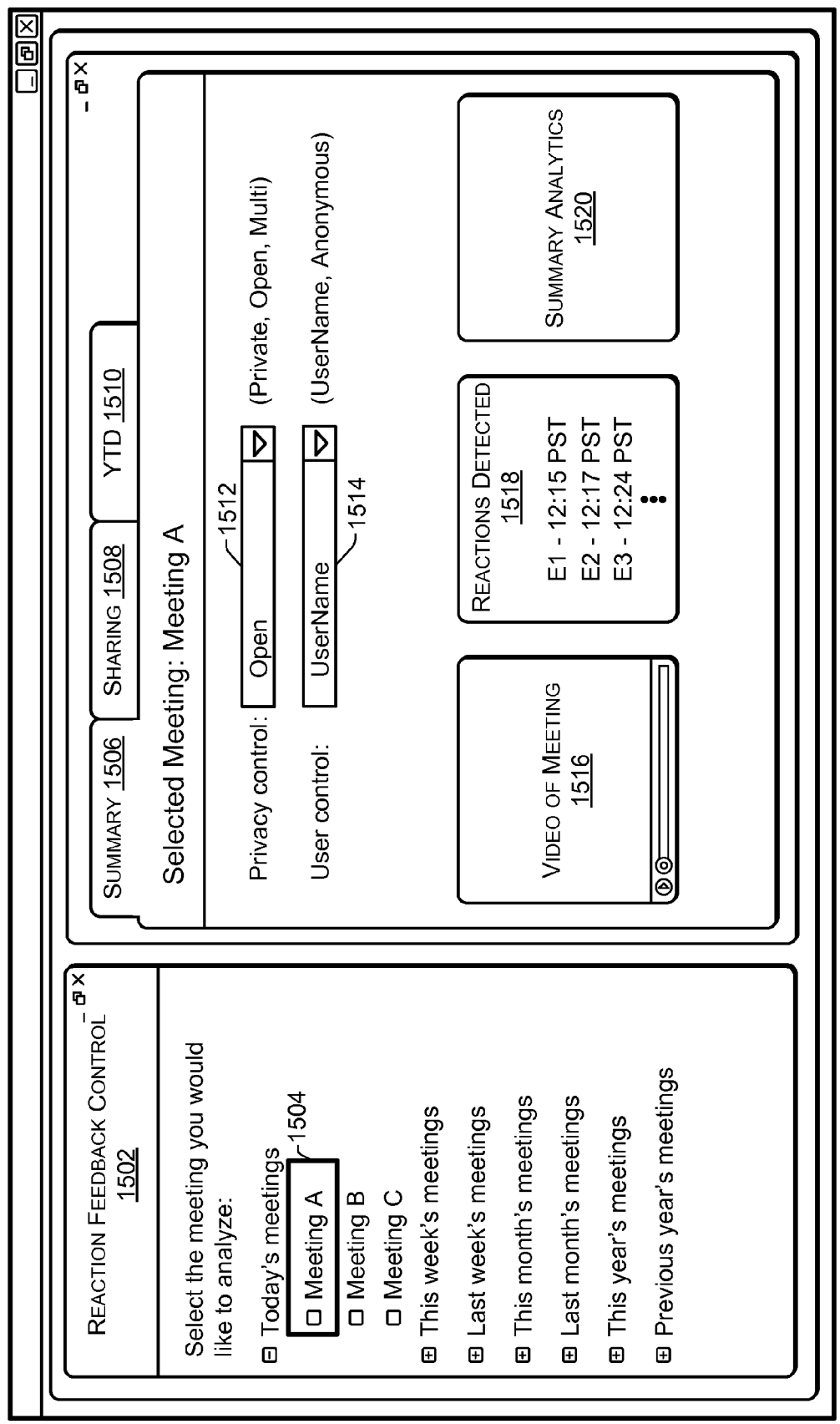
FIG. 15 depicts an example of a control interface according to some implementations.

FIG. 15 depicts an example of a control interface 1500 for managing and controlling access to and dissemination of a participant's reaction information, such as in the personal cloud 1304 described above. Control interface 1500 includes a reaction feedback control area 1502 that enables a user to select a meeting for which their reaction information was collected for controlling the access and dissemination of the information. For example, the meetings interactions may be listed according to when they took place, according to topic, task, context, or the like. In the illustrated example, the user has selected Meeting A, as indicated by box 1504. For a selected meeting, a variety of management and control options can be provided to the user, such as by a plurality of tabs in an adjacent window, including a summary tab 1506, a sharing tab 1508, and a year-to-date tab 1510. For example, the year-to-date tab 1510 can provide an aggregated analysis of the participant's reactions collected over the past year or other specified period of time.

As illustrated in FIG. 15, the summary tab 1506 may include an overview of the selected meeting including a privacy control 1512, such a dropdown menu, for selecting whether the user wishes his or her reaction information to be private, open or multi (part private, part open) during the meeting. When the privacy control is open or multi, a user control 1514, such as another dropdown menu, indicates whether the user has provided a username or remained anonymous during the meeting. Consequently, these controls can be accessed before or during the meeting to set the initial settings for the meeting, or for changing the settings during the meeting, and also provide an indication after the meeting of the privacy settings used. Further included in the summary tab 1506 may be a video recording of the meeting 1516, should the user wish to review a portion of the meeting, a listing of reactions detected 1518 during the meeting, and a summary of analytics 1520 determined from the meeting. For instance, each reaction inferred from information collected from the participant can be identified and listed according to a time when the reaction was detected. Alternatively, the reactions can be listed according to topic, context, participant speaking, or the like.

Figure 16:
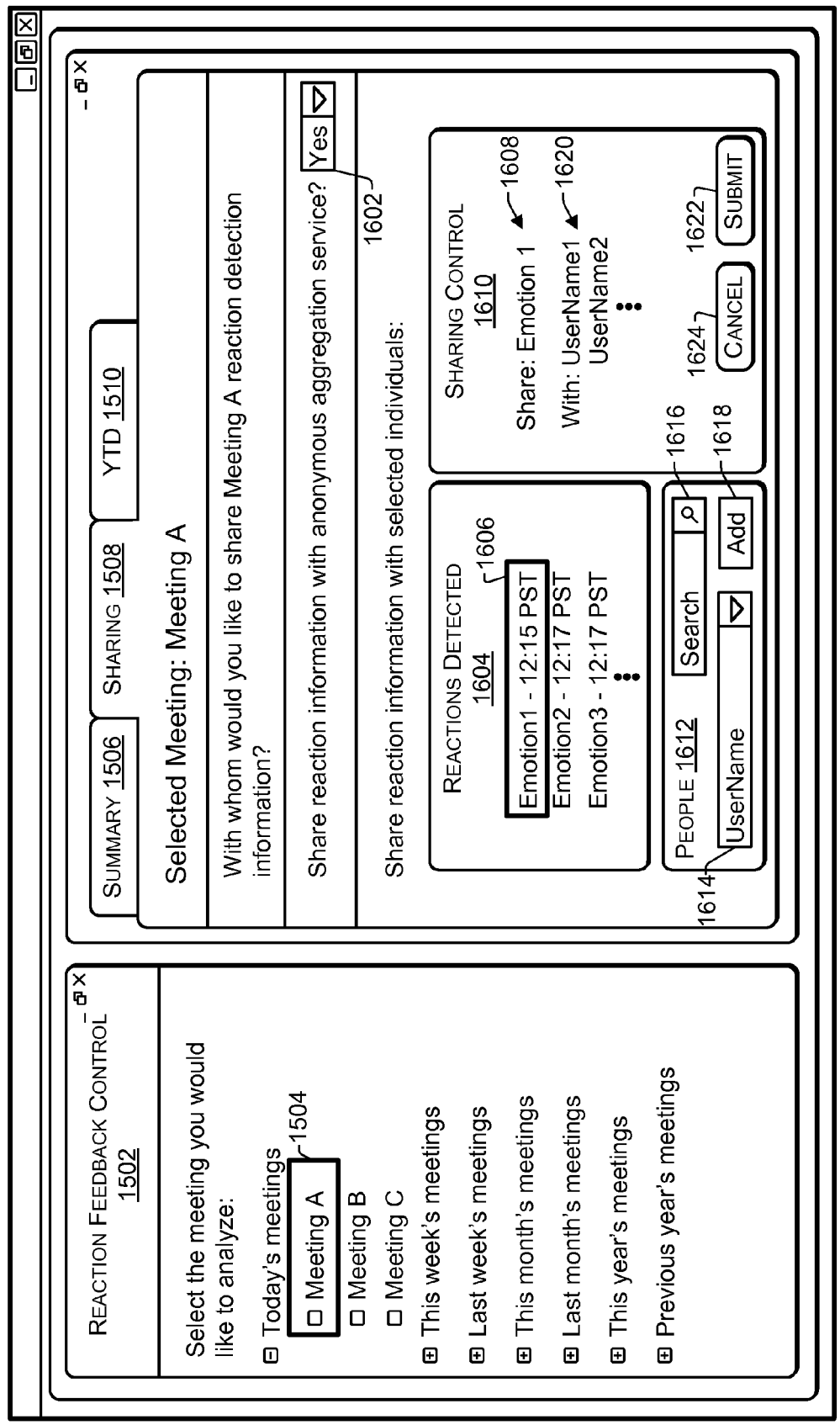
FIG. 16 depicts additional features of the control interface of FIG. 15 according to some implementations.

FIG. 16 depicts an example of the sharing tab 1508 according to some implementations. Sharing tab 1508 includes a plurality of options for sharing reaction information from a meeting or interaction with the system and/or other participants. Sharing tab 1508 may be accessed before, during or after the meeting to control sharing of the reaction information for the meeting. Sharing tab 1508 includes an option, such as a yes/no dropdown menu 1602, for indicating whether the reaction information should be shared with the anonymous aggregation service. Also, for controlling sharing of reactions with selected individuals, sharing tab 1508 may include a listing of reactions detected 1604 that lists the reactions (e.g., emotions, dispositions, etc.) interpreted from detected inputs for the user and the time during the meeting at which the reactions were detected. The user is able to decide whether to share some or all of these detected reactions 1604 with selected individuals. For example, the user may select a particular reaction to share, such as Emotionl which was detected at 12:15 during the meeting, as indicated by box 1606. The selected reaction(s) 1608 can be indicated in an adjacent sharing control window 1610. The user may also select one or more individuals with which to share the selected reaction(s) using a people-selection menu 1612 that may include a username selection dropdown menu 1614 and/or a search option 1616, and an add button 1618. As selected individuals are added, their usernames 1620 will appear in the sharing control window 1610. When the user has finished making the sharing selections, the user may click on a submit button 1622 to put the selections into effect, or may select a cancel button 1624 to cancel the selections. The control interface 1500 of FIGS. 15 and 16 is merely a non-limiting example of a suitable control interface, and numerous other possible control interfaces and variations will be apparent in light of the disclosure herein. For example, the control interface can include the ability to provide reaction feedback information to others based on a time at which the reactions were inferred, a task that was being performed, a topic that was being discussed, a context of an interaction, and so forth. Further, in some implementations, a user may select a "share all button" (not shown) to share all the reaction information, rather than selecting specific individuals, reactions, etc.

Example Environments

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or configurations, general purpose and special-purpose computing systems, or other devices having processing capability.

Additionally, the components and systems herein can be employed in many different environments and situations, and are not limited to use in a meeting or conference room. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product. The computer program product may include computer-readable media having a computer-readable program code embodied therein. The computer-readable program code may be adapted to be executed by one or more processors to implement the processes, components and/or modules of the implementations described herein. The terms "computer-readable media," "processor-accessible media," or the like, refer to any kind of non-transitory machine-readable storage medium for retaining information, and can include the various kinds of memory and storage devices discussed above. Although illustrated in FIG. 10 as being stored in memory 1004 of system computing device 902, interaction component 912, or portions thereof, may be implemented using any form of computer-readable media that is accessible by system computing device 902. Computer-readable media may include, for example, computer storage media and communications media. Computer storage media is configured to store data on a tangible medium, while communications media is not.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Implementations herein use a variety of sensing devices to detect reactions in one or more participants to provide input to an analysis component which can provide reaction information to use as feedback to augment a conversation, adjust an environment, and enable assessment and real-time reaction to participant interactions. Implementations also provide pattern recognition and analysis of reaction information at a latter point in time. The participants are provided complete control over their personal information and can choose how much of their personal information to share with others.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A system comprising:
a processor in communication with computer-readable storage media;
a sensing component, maintained in the computer-readable storage media and executed on the processor, to receive information from one or more sensors regarding a reaction of one or more participants to an interaction between participants of a meeting, wherein the information comprises biometric information associated with the one or more participants;
an analysis component to analyze the information for identifying the reaction of the one or more participants; and
a feedback component that adjusts an environment of a room in which the one or more participants are located in response to the reaction identified, wherein the one or more participants is provided with an option as to whether or not to share the reaction identified associated with the meeting to be utilized to adjust the environment of the room.

2. The system according to claim 1, wherein the feedback component adjusts an environmental parameter of the room comprising at least one of lighting, temperature, sound or aroma.

3. The system according to claim 1, wherein
the information is received by the sensing component during a first meeting; and
the feedback component adjusts the environment of the room in preparation for a second meeting conducted subsequently to the first meeting.

4. The system according to claim 1, further comprising:
receiving sensor information by the sensing component during a set of earlier meetings taking place prior to the interaction, wherein the sensor information is stored in a computer readable storage device as stored information; and
analyzing the stored information to establish a baseline of the participants' reactions to a culture or environment, wherein the system more accurately analyzes interaction-specific reactions of the participants during the interaction, and adjusts the environment of the room according to the interaction-specific reactions.

5. The system according to claim 1, wherein
the interaction comprises a videoconference between a first location and a second location;
the sensing component receives the information from one or more first sensors of the plurality of sensors that collect information from one or more participants at the first location and from second sensors of the plurality of sensors that collect information from one or more participants in the second location; and
the feedback component adjusts an environment of at least one of a room at the first location or a room at the second location.

6. The system according to claim 1, wherein the computing device is in communication with the plurality of sensors through a network, the plurality of sensors comprising sensors located in one or more chairs or tables of the one or more participants to the interaction.

7. The system according to claim 1, wherein the feedback component provides feedback to a chair of a participant based on the one more reactions identified.

8. A method comprising:
receiving data relating to a sensed physical condition of at least one participant to an interaction between participants of a gathering, wherein the sensed physical condition is ascertained by analyzing biometric information of the one or more participants;
identifying, by a processor, a reaction of the at least one participant based at least in part on the sensed physical condition;
providing the at least one participant with control over dissemination of an amount of reaction information regarding the reaction of the at least one participant to the gathering; and
providing feedback to one or more participants to the interaction based at least in part on the reaction identified.

9. The method according to claim 8, wherein the interaction includes a plurality of participants, the providing the feedback comprising providing the feedback to a presenter to inform the presenter of a reaction of the plurality of participants.

10. The method according to claim 9, wherein the feedback includes information provided to the presenter during a presentation for enabling the presenter to improve communication to the audience during the presentation.

11. The method according to claim 9, wherein the feedback includes information provided to the presenter following a presentation for the presenter to improve at least one of the presentation or a communication technique.

12. The method according to claim 8, the providing the feedback comprising providing an aggregation of reactions identified for a plurality of participants to present an indication of an overall reaction of the plurality of participants to the interaction.

13. The method according to claim 8, wherein the interaction comprises a videoconference, the receiving data relating to a sensed physical condition comprising receiving data relating to a sensed physical condition of one or more participants to the videoconference at a first location and receiving data relating to a sensed physical condition of one or more participants to the videoconference at a second location, for identifying reactions of the participants at the first location and the second location.

14. The method according to claim 8, wherein the providing feedback comprises:
providing the reaction information relating to a particular participant to the particular participant; and
providing the particular participant with a control interface providing participant with control regarding whether to share at least part of the reaction information with selected other participants.

15. The method according to claim 8, the receiving data relating to a sensed physical condition comprising sensing at least one of head movement, facial expressions, body movement, heart rate, body temperature, or respiration rate.

16. A computer-readable memory having instructions that, when executed by one or more processors, perform operations comprising:
   receiving sensor data relating to a sensed physical condition of at least one participant to an interaction;
   determining at least one reaction for the at least one participant based at least in part on the sensed physical condition; and
   providing feedback based at least in part on an analysis of the at least one reaction and one or more other reactions determined from previous interactions, wherein the feedback identifies a pattern in participant reaction from the at least one reaction and the one or more other reactions and provides information based at least in part on the identified pattern for improving communication during an interaction.

17. The memory according to claim 16, wherein the feedback indicates whether a particular individual should attend a meeting based at least in part on reactions determined for the particular individual for previous meetings.

18. The memory according to claim 16, wherein the feedback indicates a seating arrangement for one or more individuals attending a meeting.

19. The memory according to claim 16, wherein the feedback identifies one or more environmental parameters to be implemented at an interaction.

20. The memory according to claim 16, wherein the analysis comprises comparing a biometric parameter to a baseline parameter.

* * * * *